(12) United States Patent
Hu

(10) Patent No.: US 12,418,576 B2
(45) Date of Patent: Sep. 16, 2025

(54) METHOD, APPARATUS AND DEVICE FOR ENCAPSULATING MEDIA FILE, AND STORAGE MEDIUM

(71) Applicant: TENCENT TECHNOLOGY (SHENZHEN) COMPANY LIMITED, Shenzhen (CN)

(72) Inventor: Ying Hu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 130 days.

(21) Appl. No.: 18/472,464

(22) Filed: Sep. 22, 2023

(65) Prior Publication Data

US 2024/0015197 A1    Jan. 11, 2024

Related U.S. Application Data

(63) Continuation of application No. PCT/CN2022/118324, filed on Sep. 13, 2022.

(30) Foreign Application Priority Data

Oct. 15, 2021    (CN) .......................... 202111205444.5

(51) Int. Cl.
H04N 21/218    (2011.01)
H04L 65/70    (2022.01)
H04N 21/235    (2011.01)

(52) U.S. Cl.
CPC ........... *H04L 65/70* (2022.05); *H04N 21/235* (2013.01)

(58) Field of Classification Search
CPC ....... H04L 65/70; H04N 21/235; H04N 5/268
See application file for complete search history.

(56) References Cited

U.S. PATENT DOCUMENTS

| 10,404,411 | B2 | 9/2019 | Chen et al. |
| 10,542,297 | B2 | 1/2020 | Chen et al. |

(Continued)

FOREIGN PATENT DOCUMENTS

| CN | 108632674 A | 10/2018 |
| CN | 109076255 A | 12/2018 |

(Continued)

OTHER PUBLICATIONS

The World Intellectual Property Organization (WIPO) International Search Report for PCT/CN2022/118324 Dec. 15, 2022 7 Pages (including translation).

(Continued)

*Primary Examiner* — Howard D Brown, Jr.
(74) *Attorney, Agent, or Firm* — ANOVA LAW GROUP, PLLC

(57) ABSTRACT

A method for encapsulating a media file includes: acquiring coded bitstreams of panoramic pictures of N viewpoints, N being a positive integer greater than 1; and encapsulating the coded bitstreams in an entity group, and respectively adding, for at least one viewpoint in the N viewpoints, first information to a panoramic picture of the corresponding viewpoint, to obtain a media file of the panoramic pictures of the N viewpoints, the first information indicating switching information during switching from a panoramic picture of a current viewpoint to another panoramic picture of a next viewpoint.

20 Claims, 6 Drawing Sheets

(56) References Cited

U.S. PATENT DOCUMENTS

| | | | |
|---|---|---|---|
| 10,623,635 | B2 | 4/2020 | Wang et al. |
| 2018/0075576 | A1 | 3/2018 | Liu et al. |
| 2018/0109817 | A1 | 4/2018 | Wang et al. |
| 2018/0191955 | A1* | 7/2018 | Aoki ............... G11B 27/102 |
| 2018/0199042 | A1 | 7/2018 | Wang et al. |
| 2018/0199044 | A1 | 7/2018 | Wang et al. |
| 2018/0213300 | A1 | 7/2018 | Chen et al. |
| 2018/0261254 | A1 | 9/2018 | Wang et al. |
| 2019/0045238 | A1 | 2/2019 | Lai et al. |
| 2019/0139296 | A1* | 5/2019 | Lakshman ............. G06T 7/596 |
| 2019/0141311 | A1 | 5/2019 | Lee et al. |
| 2019/0266293 | A1 | 8/2019 | Ishida et al. |
| 2019/0306530 | A1 | 10/2019 | Fan et al. |
| 2019/0320156 | A1 | 10/2019 | Oh |
| 2019/0364259 | A1 | 11/2019 | Chen et al. |
| 2020/0021795 | A1 | 1/2020 | Zhou |
| 2020/0160488 | A1* | 5/2020 | Van Deventer .......... G06T 3/16 |
| 2020/0221063 | A1 | 7/2020 | Kammachi et al. |
| 2020/0226792 | A1 | 7/2020 | Wang et al. |
| 2021/0021798 | A1 | 1/2021 | Yip et al. |
| 2021/0076081 | A1* | 3/2021 | Huang ............... H04N 21/8456 |
| 2021/0152808 | A1 | 5/2021 | He et al. |
| 2021/0176446 | A1 | 6/2021 | Oh et al. |
| 2021/0176509 | A1 | 6/2021 | Maze et al. |
| 2021/0217224 | A1* | 7/2021 | Qu ..................... G06F 3/04815 |
| 2021/0250568 | A1 | 8/2021 | Huang |
| 2022/0150458 | A1 | 5/2022 | Champel |
| 2024/0015197 | A1 | 1/2024 | Hu |
| 2024/0031614 | A1* | 1/2024 | Brandt ............. H04N 21/21805 |

FOREIGN PATENT DOCUMENTS

| | | | |
|---|---|---|---|
| CN | 110313175 | A | 10/2019 |
| CN | 110876051 | A | 3/2020 |
| CN | 111727605 | A | 9/2020 |
| CN | 113949829 | A | 1/2022 |
| EP | 3646593 | A1 | 5/2020 |
| EP | 3758370 | A1 | 12/2020 |
| EP | 3846466 | A1 | 7/2021 |
| JP | 2021525470 | A | 9/2021 |
| WO | 2019002662 | A1 | 1/2019 |
| WO | 2019194529 | A1 | 10/2019 |
| WO | 2020068284 | A1 | 4/2020 |
| WO | 2021198553 | A1 | 10/2021 |

OTHER PUBLICATIONS

"ISO/IEC 23090-10 Part 10: Carriage of Visual Volumetric Video-based Coding Data", ISO/IEC JTC 1/SC 29/WG 11.

"ISO/IEC 23090-18 Part 18: Carriage of Geometry-based Point Cloud Compression Data", ISO/IEC JTC 1/SC 29/WG 11.

"ISO/IEC 23001-6 Part 6: Dynamic adaptive streaming over HTTP (DASH)", ISO/IEC JTC 1/SC 29/WG 11.

"ISO/IEC 14496-12 Part 12: ISO base media file format", ISO/IEC JTC 1/SC 29/WG 11.

"ISO/IEC 23008-1 Part 1: MPEG media transport (MMT)", ISO/IEC JTC 1/SC 29/WG 11.

"Study of User QoE Improvement for Dynamic Adaptive Streaming oveR HTTP (MPEG-DASH)", Shuai Zhao, Zhu Li, Deep Medhi, PoLin Lai, Shan Liu, Computing, International Conference on Networking and Communications (ICNC), 2017, pp. 566-570.

"Fast Sample Adaptive Offset Algorithm for 360-degree Video Coding", Yan Zhou, Zhenzhong Chen, Shan Liu, Signal Processing: Image Communication, 2020.

"Implicit Geometry Partition for Point Cloud Compression," X. Zhang, W. Gao and S. Liu, 2020 Data Compression Conference (DCC), Snowbird, UT, USA, 2020, pp. 73-82.

"Linear Model Based Geometry Coding for Lidar Acquired Point Clouds," X. Zhang, W. Gao and S. Liu, 2020 Data Compression Conference (DCC), Snowbird, UT, USA, 2020, pp. 406-406.

"Enhanced Intra Prediction Scheme in Point Cloud Attribute Compression", Honglian Wei, Yiting Shao, Jing Wang, Shan Liu, Ge Li, VCIP, 2019.

"PointHop: An Explainable Machine Learning Method for Point Cloud Classification", Min Zhang, Haoxuan You, Pranav Kadam, Shan Liu, C.-C. Jay Kuo, IEEE TMM, 2020.

"Occupancy-map-based rate distortion optimization for video-based point cloud compression", L. Li, Z. Li, S. Liu, H. Li, ICIP, 2019.

"Occupancy-map-based Rate Distortion Optimization and Partition for Video-based Point Cloud Compression", L. Li, Z. Li, S. Liu, H. Li, IEEE TCSVT, 2020.

"Video-based compression for plenoptic point cloud", L. Li, Z. Li, S. Liu, and H. Li, arXiv:1911.01355.

"Aλ-domain Perceptual Rate Control for 360-degree Video Compression", Li Li, Ning Yan, Zhu Li, Shan Liu, Houqiang Li, IEEE Journal on Selected Topics in Signal Processing, 2020.

"Efficient Projected Frame Padding for Video-based Point Cloud Compression", Li Li, Zhu Li, Shan Liu, Houqiang Li, IEEE TMM, 2019.

"Rate Control for Video-based Point Cloud Compression", Li Li, Zhu Li, Shan Liu, Houqiang Li, IEEE TIP, 2020.

"Unsupervised Feedforward Feature (UFF) Learning for Point Cloud Classification and Segmentation", Min Zhang, Pranav Kadam, Shan Liu and C.-C. Jay Kuo, 2020 IEEE International Conference on Visual Communications and Image Processing (VCIP), Dec. 1-4, 2020, Macau.

"Unsupervised Point Cloud Registration via Salient Points Analysis (SPA)", Pranav Kadam, Min Zhang, Shan Liu and C.-C. Jay Kuo, 2020 IEEE International Conference on Visual Communications and Image Processing (VCIP), Dec. 1-4, 2020, Macau.

ISO/IEC, "The head mounted display application for Free-viewpoint video service", «ISO/IEC JTC1/SC29/2G11 MPEG2015/M36488».

The State Intellectual Property Office of the People's Republic of China (SIPO) Office Action 1 for 202111205444.5 May 5, 2022 18 Pages (including translation).

Byeongdoo Choi, "Technologies under considerations for omnidirectional media application format", «ISO/IEC JTC1/SC29/WG11 N15946», Mar. 3, 2016 (Mar. 3, 2016).

* cited by examiner

METHOD, APPARATUS AND DEVICE FOR ENCAPSULATING MEDIA FILE, AND STORAGE MEDIUM

CROSS-REFERENCES TO RELATED APPLICATIONS

The application is a continuation application of PCT Patent Application No. PCT/CN2022/118324, entitled "MEDIA FILE ENCAPSULATION METHOD, APPARATUS AND DEVICE, AND STORAGE MEDIUM" and filed on Sep. 13, 2022, which claims priority to Chinese Patent Application No. 202111205444.5, entitled "METHOD, APPARATUS AND DEVICE FOR ENCAPSULATING MEDIA FILE, AND STORAGE MEDIUM" filed with the Chinese Patent Office on Oct. 15, 2021, the entire contents of both of which are incorporated herein by reference.

FIELD OF THE TECHNOLOGY

Embodiments of the present disclosure relate to the technical field of video processing, and in particular to a method, apparatus and device for encapsulating a media file, and a storage medium.

BACKGROUND

Immersive media refer to media content which can bring immersive experience to consumers. The immersive media can be divided into three-Degree-of-Freedom (DoF) media, 3DoF+ media and 6DoF media according to the degree of freedom of a user when the user consumes the media content.

According to an existing video coded bitstream encapsulation mode, for a media file including panoramic picture items of multiple viewpoints, when a device for de-encapsulating a file is used for switching between the panoramic picture items of multiple viewpoints, the switching effect is poor.

SUMMARY

The present disclosure provides a method, apparatus and device for encapsulating a media file, and a storage medium, and aims to improve the switching efficiency between panoramic pictures of multiple viewpoints.

In a first aspect, the present disclosure provides a method for encapsulating a media file, applied to a device for encapsulating a file. The device for encapsulating a file can be understood as a video encapsulation device or a coding device. The method includes: receiving coded bitstreams of panoramic pictures of N viewpoints, N being a positive integer greater than 1; and encapsulating the coded bitstreams in an entity group, and respectively adding, for at least one viewpoint in the N viewpoints, first information to a panoramic picture of the corresponding viewpoint, to obtain a media file of the panoramic pictures of the N viewpoints, the first information indicating switching information during switching from a panoramic picture of a current viewpoint to another panoramic picture of a next viewpoint.

In a second aspect, the present disclosure provides a method for de-encapsulating a media file, applied to a device for de-encapsulating a file. The device for de-encapsulating a file can be understood as a video de-encapsulation device or a decoding device. The method includes: acquiring a media file of panoramic pictures of N viewpoints, the media file including, for each of at least one viewpoint in the N viewpoints, first information of a panoramic picture of the corresponding viewpoint, and the first information indicating switching information during switching from a panoramic picture of a current viewpoint to another panoramic picture of a next viewpoint; and switching between the panoramic pictures of different viewpoints according to the first information corresponding to the at least one viewpoint.

In a third aspect, the present disclosure provides an apparatus for encapsulating a media file, applied to a device for encapsulating a file. The apparatus includes: an acquisition unit, configured to acquire coded bitstreams of panoramic pictures of N viewpoints, N being a positive integer greater than 1; and an encapsulation unit, configured to encapsulate the coded bitstreams in an entity group, and respectively add first information to a panoramic picture of at least one viewpoint in the N viewpoints to obtain a media file of the panoramic picture of the N viewpoints, the first information indicating switching information during switching from a panoramic picture of a current viewpoint to another panoramic picture of a next viewpoint.

In a fourth aspect, the present disclosure provides an apparatus for de-encapsulating a media file, applied to a device for de-encapsulating a file. The apparatus includes: an acquisition unit, configured to acquire a media file of panoramic pictures of N viewpoints, the media file including first information of a panoramic picture of at least one viewpoint in the N viewpoints, and the first information indicating switching information during switching from a panoramic picture of a current viewpoint to another panoramic picture of a next viewpoint; and a de-encapsulation unit, configured to switch between the panoramic pictures of different viewpoints according to the first information corresponding to the at least one viewpoint.

In a fifth aspect, the present disclosure provides a device for encapsulating a file. The device for encapsulating a file includes: at least one processor and at least one memory. The at least one memory is configured to store a computer program. The at least one processor is configured to call and run the computer program stored in the at least one memory so as to execute the method in the first aspect.

In a sixth aspect, the present disclosure provides a device for de-encapsulating a file. The device for de-encapsulating a file includes: at least one processor and at least one memory. The at least one memory is configured to store a computer program. The at least one processor is configured to call and run the computer program stored in the at least one memory so as to execute the method in the second aspect.

In a seventh aspect, the present disclosure provides an electronic device. The electronic device includes: at least one processor and at least one memory. The at least one memory is configured to store a computer program. The at least one processor is configured to call and run the computer program stored in the at least one memory y so as to execute the method in the first aspect and/or the second aspect.

In an eighth aspect, the present disclosure provides a non-transitory computer-readable storage medium, configured to store a computer program; and the computer program enables a computer to execute the method in the first aspect and/or the second aspect.

In conclusion, in the present disclosure, the device for encapsulating a file acquires the coded bitstreams of the panoramic picture of N viewpoints, and N is a positive integer greater than 1; the coded bitstreams are encapsulated in the entity group; the first information is respectively added to the panoramic picture of at least one viewpoint in the N viewpoints to obtain the media file of the panoramic picture of N viewpoints, and the first information indicates the switching information during switching from the panoramic picture of the current viewpoint to the panoramic picture of the next viewpoint. Therefore, the device for de-encapsulating a file can switch and present the panoramic pictures of different viewpoints according to the switching information indicated by the first information, thereby improving the switching effect of the panoramic pictures of multiple viewpoints.

BRIEF DESCRIPTION OF THE DRAWINGS

To describe technical solutions in embodiments of the present disclosure more clearly, the following briefly describes the accompanying drawings required for describing the embodiments. Apparently, the accompanying drawings in the following description show merely some embodiments of the present disclosure.

DESCRIPTION

Figure 1:
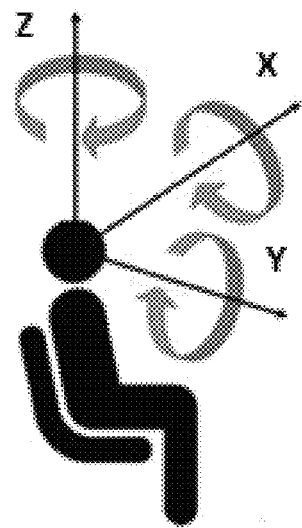
FIG. 1 is a schematic diagram of three-degree-of-freedom.

The following clearly and completely describes technical solutions in embodiments of the present disclosure with reference to accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

In the specification, claims, and the foregoing accompanying drawings of the present disclosure, the terms "first", "second", and so on are intended to distinguish between similar objects rather than indicating a specific order. It is to be understood that data used in this way is exchangeable in a proper case, so that the embodiments of the present disclosure described herein can be implemented in an order different from the order shown or described herein. Moreover, the terms "include", "contain" and any other variants mean to cover the non-exclusive inclusion, for example, a process, method, system, product, or server that includes a list of steps or units is not necessarily limited to those expressly listed steps or units, but may include other steps or units not expressly listed or inherent to such a process, method, system, product, or device.

Embodiments of the present disclosure relates to a data processing technology of an immersive media.

Before describing the technical solution of the present disclosure, related knowledge of the present disclosure is described as follows:

Panoramic video/image: After multi-camera acquisition, splicing and mapping, a part of media pictures can be provided according to the viewing direction or window of a user, and a video or image of 360-degree pictures is provided at most. The panoramic video/image is an immersive media providing three-degree-of-freedom experience.

Multi-viewangle/multi-viewpoint video: A video having depth information shot from multiple angles by adopting multiple groups of camera arrays. The multi-viewangle/multi-viewpoint video is also called a free-viewangle/free-viewpoint video and is an immersive media providing six-degree-of-freedom experience.

Point cloud: The point cloud is a group of discrete point sets which are irregularly distributed in the space and express a spatial structure and surface properties of a three-dimensional object or scene. Each point in the point cloud at least has three-dimensional position information, and may have color, material or other information according to different application scenes. Generally, each point in the point cloud has the same number of additional properties.

V3C volumetric media: Visual volumetric video-based coding media; V3C volumetric media refers to an immersive media which is captured from three-dimensional space visual content, provides 3DoF+ and 6DoF viewing experience, is coded by traditional video codec and contains volume video type tracks in file encapsulation; and the immersive media includes multi-viewangle videos, video coding point clouds and the like.

PCC: Point Cloud Compression.

G-PCC: Geometry-based Point Cloud Compression.

V-PCC: Video-based Point Cloud Compression.

Atlas: It indicates region information on a 2D plane frame, region information of a 3D presentation space, a mapping relation between the two and necessary parameter information required by mapping.

Track: It is a media data set in the media file encapsulation process; and one media file can be composed of a plurality of tracks, for example, one media file can include a video track, an audio track and a subtitle track.

Sample: It is an encapsulation unit in the media file encapsulation process; and one media track is composed of a plurality of samples. For example, one sample of the video track is usually a video frame.

DoF: Degree of freedom; it refers to the number of independent coordinates in a mechanical system, including rotation and vibration degrees of freedom besides translation degrees of freedom. According to the embodiment of the present disclosure, it refers to the degree of freedom of the movement supported and generated content interaction when the user watches immersive media.

3DoF: Three-degree-of-freedom; it refers to three-degree-of-freedom of the head of the user rotating around XYZ axes. FIG. 1 is a schematic diagram of three-degree-of-freedom. As shown in FIG. 1, the head can rotate on three axes at a certain place and a certain point, or turn, lower up and down, and swing. Through the experience of three-degree-of-freedom, the user can sink in a field by 360 degrees. If static, it can be understood as a panoramic picture. If the panoramic picture is moving, it is a panoramic video, that is, a VR video. However, VR video is limited to some extent, and the user cannot move and select any place to watch.

Figure 2:
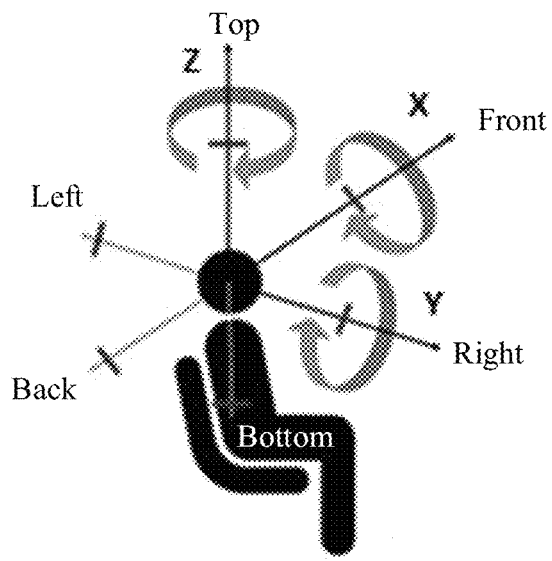
FIG. 2 is a schematic diagram of three-degree-of-freedom+.

3DoF+: It is the degree of freedom for the user to do limited motion along the XYZ axes on the basis of three-degree-of-freedom, and can also be referred to as limited six-degree-of-freedom, and the corresponding media coded bitstream can be referred to as limited six-degree-of-freedom media coded bitstream. FIG. 2 is a schematic diagram of three-degree-of-freedom+.

Figure 3:
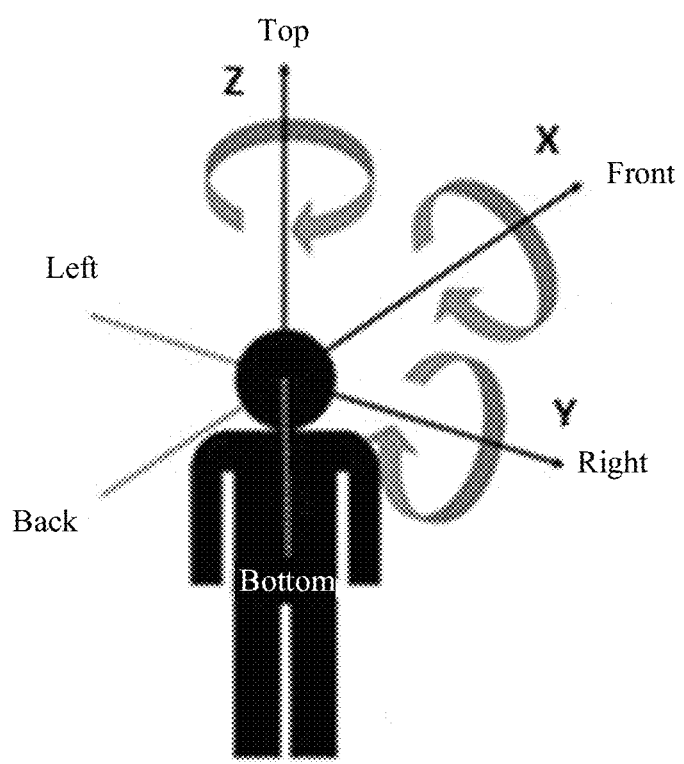
FIG. 3 is a schematic diagram of six-degree-of-freedom.

6DoF: It is the degree of freedom for the user to do free motion along the XYZ axes on the basis of three-degree-of-freedom, and the corresponding media coded bitstream can be referred to as a six-degree-of-freedom media coded bitstream. FIG. 3 is a schematic diagram of six-degree-of-freedom. The 6DoF media refers to a 6-degree-of-freedom video, and the video can provide high-degree-of-freedom viewing experience that the user can freely move a viewpoint in the XYZ axes direction of a three-dimensional space and freely rotate the viewpoint around the XYZ axes. The 6DoF media is a video combination of different spatial visual angles acquired by the camera array. In order to facilitate expression, storage, compression and processing of the 6DoF media, the 6DoF media data is expressed as a combination of the following information: texture maps acquired by multiple cameras, depth maps corresponding to the texture maps of the multiple cameras, and corresponding 6DoF media content description metadata, and the metadata includes parameters of the multiple cameras and description information such as splicing layout and edge protection of the 6DoF media. At the encoder side, the texture map information of the multiple cameras and the corresponding depth map information are spliced, and the description data of the splicing mode is written into metadata according to the defined grammar and semantics. The spliced depth map and texture map information of the multiple cameras is coded in a plane video compression mode and transmitted to a terminal to be decoded, and then synthesis of a 6DoF virtual viewpoint requested by a user is carried out, so that the 6DoF media viewing experience of the user is provided.

AVS: Audio Video Coding Standard.

ISOBMFF: ISO Based Media File Format; it is a standard media file format based on ISO (International Standard Organization). The ISOBMFF refers to an encapsulation standard of the media file, and the most typical ISOBMFF file is an MP4 (Moving Picture Experts Group 4) file.

DASH: Dynamic adaptive streaming over HTTP; it is an adaptive bit rate streaming technology through which the high-quality streaming media can be transmitted through the Internet by a HTTP network server.

MPD: Media presentation description; it is a media presentation description signaling in DASH and configured to describe media segment information.

HEVC: High Efficiency Video Coding, international video coding standard HEVC/H.265.

VVC: Versatile video coding, international video coding standard VVC/H.266.

Intra (picture) Prediction: Intra (picture) prediction.

Inter (picture) Prediction: Inter (picture) prediction.

SCC: Screen content coding.

The panoramic video or image is usually shot, spliced and mapped by the multiple cameras, and then a sphere video or image in a 360-degree image range can be obtained. The panoramic video or image is a typical 3DoF media.

The multi-viewangle video is usually shot by the camera array from multiple angles to form texture information (such as color information) and depth information (such as spatial distance information) of the scene, and mapping information from the 2D plane frame to the 3D presentation space is combined, so that a 6DoF media capable of being consumed on a user side is formed.

The point cloud is a group of discrete point sets which are irregularly distributed in the space and express a spatial structure and surface properties of a three-dimensional object or scene. Each point in the point cloud at least has three-dimensional position information, and may have color, material or other information according to different application scenes. Generally, each point in the point cloud has the same number of additional properties.

The point cloud can flexibly and conveniently express the spatial structure and surface properties of the three-dimensional object or scene, so that the application is wide, including Virtual Reality (VR) games, Computer Aided Design (CAD), Geographic Information System (GIS), Automatic Navigation System (ANS), digital cultural heritage, free viewpoint broadcasting, three-dimensional immersion remote presentation, three-dimensional reconstruction of biological tissues and organs, etc.

Point cloud acquisition mainly includes the following ways: computer generation, 3D laser scanning, 3D photogrammetry, etc. The computer can generate point clouds of a virtual three-dimensional object and scene. The 3D scanning can obtain point clouds of a three-dimensional object or scene of a static real world, and million-level point clouds can be obtained per second. The 3D camera can obtain point clouds of a three-dimensional object or scene of dynamic real world, and ten million-level point clouds can be obtained per second. In addition, in the medical field, point clouds of biological tissues and organs can be obtained through MRI, CT and electromagnetic positioning information. According to the technologies, the point cloud data acquisition cost and time cycle are reduced, and the data precision is improved. Due to the change of the point cloud data acquisition mode, a large amount of point cloud data can be acquired. With continuous accumulation of large-scale point cloud data, efficient storage, transmission, release, sharing and standardization of the point cloud data become the key of point cloud application.

After the point cloud media is coded, the coded data stream needs to be encapsulated and transmitted to the user. Correspondingly, at the point cloud media player end, the point cloud file needs to be de-encapsulated firstly, then decoding is carried out, and finally the decoded data stream is presented. Therefore, in the de-encapsulating link, after specific information is acquired, the efficiency of the decoding link can be improved to a certain extent, and as a result, better experience is brought to presentation of the point cloud media.

Figure 4:
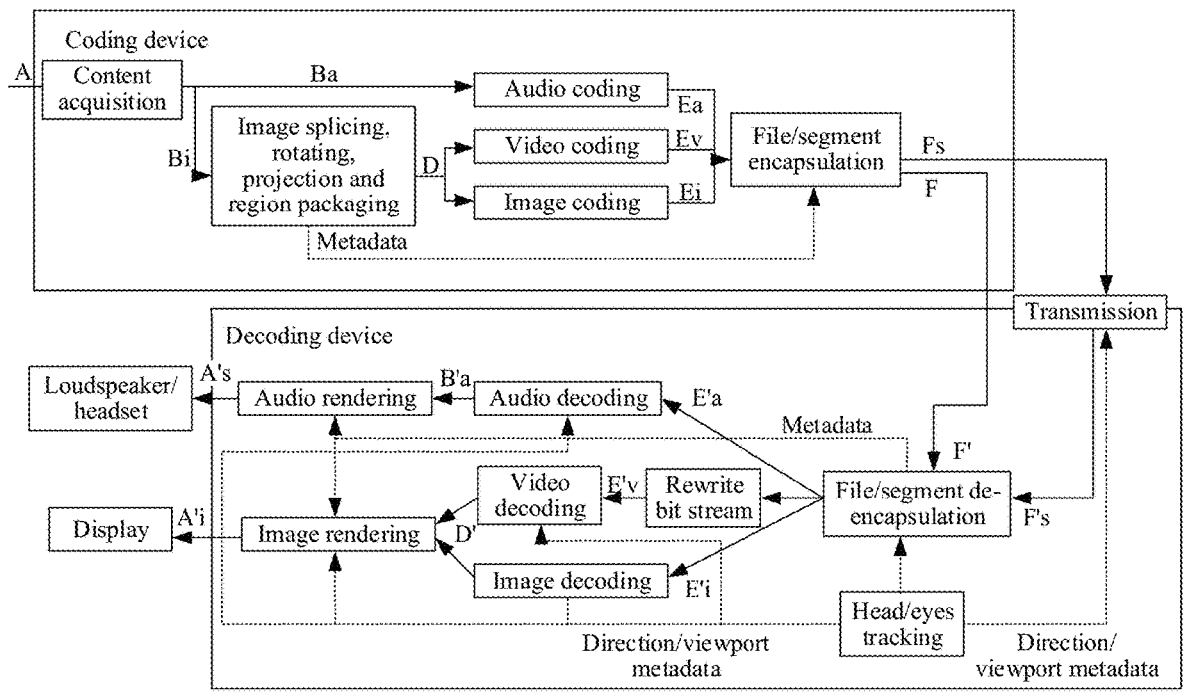
FIG. 4 is an architecture diagram of an immersive media system according to one embodiment of the present disclosure.

FIG. 4 is an architecture diagram of an immersive media system according to one embodiment of the present disclosure. As shown in FIG. 4, the immersive media system includes a coding device and a decoding device; the coding device can be a computer device used by a provider of immersive media, and the computer device can be a terminal (such as a Personal Computer (PC)), an intelligent mobile device (such as a smart phone) or a server. The decoding device can be a computer device used by a user of the immersive media, and the computer device can be a terminal (such as a Personal Computer (PC)), an intelligent mobile device (such as a smart phone), a VR device (such as a VR helmet and VR glasses). The data processing process of the immersive media includes a data processing process on the side of the coding device and a data processing process on the side of the decoding device.

The data processing process at the coding device end mainly includes the following steps:
(1) acquiring and manufacturing process of media content of the immersive media; and
(2) coding and file encapsulating of the immersive media.

The data processing process at the decoding device end mainly includes the following steps:
(3) file de-encapsulation and decoding process of the immersive media; and
(4) rendering process of the immersive media.

In addition, a transmission process of the immersive media is involved between the coding device and decoding device; the transmission process can be carried out based on various transmission protocols; and the transmission protocols can include but are not limited to a DASH (Dynamic Adaptive Streaming over HTTP) Protocol, an HLS (HTTP Live Streaming, dynamic code rate adaptive transmission) protocol, an SMTP (Smart Media Transport Protocol), a TCP (Transmission Control Protocol), etc.

All processes involved in the data processing process of the immersive media are introduced in detail as follows in combination with FIG. 4.

I. Data Processing Process at Coding Device End:
(1) Acquiring and Manufacturing Process of the Media Content of the Immersive Media.
1) Acquiring Process of the Media Content of the Immersive Media.

The audio-visual scene (A) of the real world is captured by an audio sensor and a group of cameras or a camera device with a plurality of lenses and sensors. A group of digital image/video (Bi) and audio (Ba) signals are collected and generated. The camera/lens generally covers all directions around a center point of the camera group or the camera device, so that the camera/lens is called 360-degree video.

In one embodiment, a capture device can be a hardware component arranged in the coding device, for example, the capture device can be a microphone, a camera, a sensor and the like of a terminal. In another embodiment, the capture device can also be a hardware device connected with the coding device, such as a camera connected with a server.

The capture device can include but is not limited to an audio device, a camera device and a sensing device. The audio device can include an audio sensor, a microphone and the like. The camera device can include a common camera, a stereo camera, a light field camera and the like. The sensing device can include a laser device, a radar device and the like.

There can be multiple capture devices, these capture devices are deployed at some specific positions in a real space to capture audio content and video content at different angles in the space at the same time, and the captured audio content and video content are kept synchronous in time and space. The media content collected through the capture device is referred to as original data of the immersive media.

2) Manufacturing Process of the Media Content of the Immersive Media.

The captured audio content is internally the content suitable for executing audio coding of the immersive media. The captured video content can become the content suitable for executing video coding of the immersive media after a series of manufacturing processes, and the manufacturing process includes the following steps:

① Splicing. The captured video content is shot by the capture device at different angles, the splicing refers to splicing the video content shot at various angles into a complete video capable of reflecting 360-degree visual panorama of the real space, namely the spliced video is a panoramic video (or sphere video) represented in a three-dimensional space.

② Projection. The projection refers to a process of mapping the spliced three-dimensional video onto a two-dimensional (3-Dimension, 2D) image, and the 2D image formed by projection is referred to as a projected image; and the projection mode can include but not limited to longitude and latitude map projection and regular hexahedron projection.

③ Region encapsulation. The projected image can be directly coded, and the projected image can also be coded after being subjected to region encapsulation. In practice, it is found that in the data processing process of the immersive media, the video coding efficiency of the immersive media can be greatly improved by carrying out region encapsulation on the two-dimensional projected image and then coding the two-dimensional projected image, so that the region encapsulation technology is widely applied to the video processing process of the immersive media. The region encapsulation refers to a process of executing conversion processing on the projected image according to regions, and the region encapsulation process enables the projected image to be converted into an encapsulated image. The region encapsulation process specifically includes the following steps: dividing the projected image into a plurality of mapping regions, then respectively carrying out conversion processing on the plurality of mapping regions to obtain a plurality of encapsulation regions, and mapping the plurality of encapsulation regions into a 2D image to obtain the encapsulated image. The mapping region is a region obtained by dividing the projected image before region encapsulation is executed; and the encapsulation region is a region located in the encapsulated image after region encapsulation is executed.

The conversion processing can include but is not limited to mirroring, rotation, rearrangement, up-sampling, down-sampling, region resolution change, movement, etc.

Only the panoramic video can be captured by adopting the capture device; after the video is processed by the coding device and transmitted to the decoding device for corresponding data processing, a user on the decoding device side can only watch 360-degree video information by executing some specific actions (such as head rotating); however, corresponding video changes cannot be obtained when non-specific actions (such as head moving) are executed; the VR experience is poor, so that depth information matched with the panoramic video needs to be additionally provided to enable the user to obtain better immersion and better VR experience, and the 6DoF (Six-degree-of-freedom) manufacturing technology is involved. When the user can move relatively freely in a simulated scene, it is called 6DoF. When the 6DoF manufacturing technology is adopted for manufacturing the video content of the immersive media, the capture device is generally the light field camera, the laser device, the radar device and the like to capture point cloud data or light field data in the space, and some specific processing such as the processes of cutting and mapping the point cloud data and the calculation process of the depth information is also needed in the process of executing the manufacturing processes ①-③.

At the same time, the image (Bi) in the example is subjected to splicing, rotating, projection and region packaging to form a picture (D).

(2) Coding and File Encapsulating of the Immersive Media.

The captured audio content can be directly subjected to audio coding to form an audio coded bitstream of the immersive media. After the production processes ①-② or ①-③ video coding is carried out on the projected image or the encapsulated image to obtain a video coded bitstream of the immersive media, for example, the encapsulated image (D) is coded into a coded image (Ei) or a coded video bit stream (Ev). The captured audio (Ba) is coded into an audio bit stream (Ea). Then, according to a specific media container file format, the coded image, video and/or audio are combined into a media file (F) for file playback or a sequence (Fs) of an initialization segment and a media segment for streaming transmission. The coding device end also includes metadata, such as projection and region information, which is contained into the file or the fragment to help presentation of the decoded encapsulated image.

If the 6DoF manufacturing technology is adopted, a specific coding mode (such as point cloud coding) needs to be adopted for coding in the video coding process. The audio coded bitstream and the video coded bitstream are encapsulated in a file container according to the file format (such as an ISOBSMF (ISO Base Media File Format) of the immersive media to form a media file resource of the immersive media, and the media file resource can be a media file or a media file of the immersive media formed by media segments; and the metadata of the media file resource of the immersive media is recorded by adopting Media Presentation Description (MPD) according to the file format requirement of the immersive media, and the metadata is a general term of information related to presentation of the immersive media, and the metadata can include description information of media content, description information of a window, signaling information related to presentation of the media content and the like. As shown in FIG. 4, the coding device will store the media presentation description information and the media file resource formed after the data processing process.

The immersive media system supports a data box (Box) that refers to a data block or object including the metadata, i.e., the data box contains the metadata of the corresponding media content. The immersive media may include a plurality of data boxes, such as a Sphere Region Zooming Box containing metadata for describing sphere region zooming information, a 2DRegionZoomingBox containing metadata for describing 2D region zooming information, and a Region Wise PackingBox containing metadata for describing corresponding information in a region encapsulation process.

A fragment Fs is delivered to a player through a delivery mechanism.

II. Data Processing Process at Decoding Device End:

(3) File De-Encapsulation and Decoding Process of the Immersive Media.

The decoding device can adaptively and dynamically obtain the media file resources of the immersive media and the corresponding media presentation description information from the coding device through recommendation of the coding device or according to the user requirements of the decoding device end, for example, the decoding device can determine the orientation and position of the user according to tracking information of the head/eyes/body of the user, and then dynamically requests the coding device to obtain the corresponding media file resources based on the determined orientation and position. The media file resources and the media presentation description information are transmitted to the decoding device by the coding device through the transmission mechanism (such as DASH and SMT). The file de-encapsulation process at the decoding device end is reverse to the file encapsulation process at the coding device end, and the decoding device de-encapsulates the media file resources according to file format requirements of the immersive media to obtain the audio coded bitstream and the video coded bitstream. The decoding process at the decoding device end is reverse to the coding process at the coding device end, and the decoding device performs audio decoding on the audio coded bitstream to restore audio content.

In addition, the decoding process of the decoding device on the video coded bitstream includes the following steps:

① Decode the video coded bitstream to obtain a plane image, the plane image referring to the encapsulated image if the metadata provided according to media presentation description information indicates that the immersive media executes the region encapsulation process, and the plane image referring to the projected image if the metadata indicates that the immersive media does not execute the region encapsulation process;

② Perform region de-encapsulation on the encapsulated image to obtain the projected image through the decoding device if the metadata indicates that the immersive media executes the region encapsulation process. The region de-encapsulation is reverse to the region encapsulation, the region de-encapsulation refers to a process of performing inverse conversion processing on the encapsulated image according to regions, and the region de-encapsulation enables the encapsulated image to be converted into the projected image. The region de-encapsulation process specifically includes the following steps: performing inverse conversion processing on a plurality of encapsulated regions in the encapsulated image according to the indication of the metadata to obtain a plurality of mapping regions, and mapping the plurality of mapping regions to a 2D image to obtain the projected image. The inverse conversion processing refers to processing inverse to the conversion processing, for example, the conversion processing refers to 90-degree anticlockwise rotation, and the inverse conversion processing refers to 90-degree clockwise rotation.

③ Reconstruct the projected image according to the media presentation description information to convert the projected image into the 3D image, the reconstruction processing referring to processing of re-projecting the two-dimensional projected image into the 3D space.

(4) Rendering Process of the Immersive Media.

The decoding device renders the audio content obtained by audio decoding and the 3D image obtained by video decoding according to the metadata related to rendering and the window in the media presentation description information, and playing output of the 3D image is realized after rendering is completed. Particularly, if the 3DoF and 3DoF+ manufacturing technology is adopted, the decoding device renders the 3D image mainly based on the current viewpoint, parallax, depth information and the like; and if the 6DoF manufacturing technology is adopted, the decoding device renders the 3D image in the window mainly based on the current viewpoint. The viewpoint refers to a viewing position point of the user; the parallax refers to a sight difference generated by two eyes of the user or a sight difference generated by motion; and the window refers to a viewing region.

The immersive media system supports a data box (Box) that refers to a data block or object including the metadata, i.e., the data box contains the metadata of the corresponding media content. The immersive media may include a plurality of data boxes, such as a Sphere Region Zooming Box containing metadata for describing sphere region zooming information, a 2DRegionZoomingBox containing metadata for describing 2D region zooming information, and a Region Wise PackingBox containing metadata for describing corresponding information in a region encapsulation process.

As shown in FIG. 4, a file (F) output by the coding device end is the same as a file (F') inputted by the decoding device end. The decoding device end processes the file (F') or a received fragment (F's) to extract a coded bit stream (E'a, E'v and/or E'i) and parses the metadata. The viewport-related video data may be carried in multiple tracks, which may be rewritten in the bit stream and combined into a single video bit stream E'v before decoding. The audio, video and/or images are then decoded into decoded signals (B'a is an audio signal and D' is an image/video signal). The decoded image/video (D') is displayed on a screen of a head-mounted display or any other display device based on the current viewing direction or viewport, and information in the metadata such as projection, sphere coverage, rotation and area. The current viewing direction is determined by head tracking information and/or eye tracking information. At the same time, the decoded audio signal (B'a) is rendered, for example, taking by a user through a headset. In addition to the video signal and audio signal being rendered, the current viewing direction may also be used to optimize the decoding. In the related delivery of the viewport, the current viewing direction is also passed to a policy module that determines the video track to be received according to the viewing direction.

Related data boxes involved in the embodiment of the present disclosure is described as follows:
Data box type: 'vpia'
Included in: GroupsListBox
Mandatory: No
Quantity: 0 or more If the group type of EntityToGroupBox is 'vpia', it indicates that the items in the entity group are panoramic pictures of different viewpoints.
Grammar

```
aligned(8) class ViewpointItemAssociationBox
extends EntityToGroupBox('vpia') {
    unsigned int(32) group_id;
    unsigned int(32) num_entities_in_group;
    for(i=0; i<num_entities_in_group; i++){
        unsigned int(32) entity_id;
        unsigned int(1) initial_viewpoint_flag;
        bit(7) reserved;
        string viewpoint_label;
    }
}
```

Semantics
group_id: it is a non-negative integer configured to identify a specific entity group. The value of this field cannot be the same as the group_id of any other entity group; and it also cannot be the same as any other item_ID or track_ID containing GroupsListBox.

num_entities_in_group: it indicates the number of the entity_id mapped to this entity group.

initial_viewpoint_ID: it indicates entity_id of the initial viewpoint:

entity_id: it is the value of item_ID of some item or the value of track_ID of some track.

initial_viewpoint_flag: it indicates whether the item is the initial viewpoint.

viewpoint_label: it indicates the descriptive label of the corresponding viewpoint, which is a string ending with a null character.

As described above, in the current scheme, different viewpoints of the panoramic picture are associated, the information of the initial viewpoint is indicated, and the device for de-encapsulating a file switches the viewpoints according to the associated information.

In order to solve the above technical problems, the device for encapsulating a file in the present disclosure adds first information to a panoramic picture item of at least one viewpoint in N viewpoints to obtain a media file of the panoramic picture of N viewpoints, and the first information indicates switching information when the current viewpoint is switched to the next viewpoint. Therefore, the device for de-encapsulating a file can realize switching and presentation of the panoramic pictures of different viewpoints according to the switching information indicated by the first information, thereby improving the switching effect of the panoramic pictures of multiple viewpoints.

The technical solution of the embodiments of the present disclosure is described in detail through some embodiments in the following. The following embodiments may be mutually combined, and same or similar concepts or processes may not be repeatedly described in some embodiments.

Figure 5:
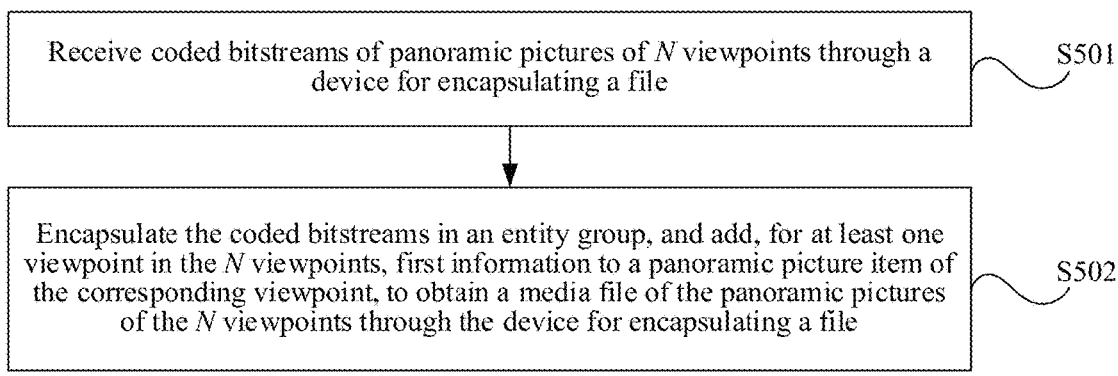
FIG. 5 is a flowchart of a method for encapsulating a media file according to one embodiment of the present disclosure.

FIG. 5 is a flowchart of a method for encapsulating a media file according to the embodiment of the present disclosure, and as shown in FIG. 5, the method includes the following steps:

S501: Receive coded bitstreams of panoramic pictures of N viewpoints through a device for encapsulating a file.

N is a positive integer greater than 1, that is to say, the researched panoramic pictures in the embodiment of the present disclosure are panoramic pictures of at least two different viewpoints, for example, panoramic pictures acquired from three different viewpoints or panoramic pictures acquired from six different viewpoints.

In some embodiments, the panoramic picture of N viewpoints is not associated in content.

In some embodiments, the panoramic pictures of part of the viewpoints in the N viewpoints are associated in content.

In some embodiments, the panoramic picture of N viewpoints is associated in content.

In one example, the content association relationship can be that the contents of panoramic pictures are partially or completely the same, for example, the panoramic pictures of N viewpoints are panoramic pictures acquired from the same static scene at different viewpoints.

In another example, the content association relationship can also be that the objects corresponding to the panoramic pictures have the association relationship, for example, the object 1 is a computer, the object 2 is a table, and the computer is placed on the table, so that the object 1 and the object 2 have the association relationship. According to the embodiment of the present disclosure, the type of the specific association relationship existing between the panoramic pictures is not limited.

In some embodiments, the device for encapsulating a file is also called a video encapsulation device, or a video coding device or the like.

In the embodiment of the present disclosure, the mode of the device for encapsulating a file acquiring the coded bitstreams of the panoramic pictures of N viewpoints includes but is not limited to the follows:

Mode 1: The device for encapsulating a file acquires the coded bitstreams of the panoramic picture of N viewpoints from other devices.

For example, the device for encapsulating a file acquires the coded bitstreams of the panoramic pictures of N viewpoints from the memory device, or acquires the coded bitstreams of the panoramic pictures of N viewpoints from other coding devices.

Mode 2: The device for encapsulating a files codes the panoramic pictures of N viewpoints to obtain the coded bitstreams of the panoramic picture of N viewpoints. For example, the device for encapsulating a file is the coding device, and the device for encapsulating a files codes the panoramic pictures of N viewpoints after acquiring the panoramic pictures of N viewpoints from an acquisition device (such as a camera) to obtain the coded bitstreams of the panoramic pictures of N viewpoints.

S502: Encapsulate coded bitstreams in an entity group, and add, for at least one viewpoint in the N viewpoints, first information to a panoramic picture item of the corresponding viewpoint, to obtain a media file of panoramic picture of N viewpoints through the device for encapsulating a file. In some embodiments, the corresponding information is added for each of the at least one viewpoint in the N viewpoints.

The first information indicates switching information when the current viewpoint is switched to the next viewpoint.

The device for encapsulating a file encapsulates the coded bitstreams of the panoramic picture of N viewpoints in one or more entity groups, and one entity group includes the coded bitstream of the panoramic picture of at least one viewpoint.

For example, it is assumed that N=100, every 10 items are divided in one entity group, then 10 entity groups are obtained, and each entity group includes the coded bitstreams of the panoramic pictures of 10 viewpoints.

According to the present disclosure, in order to facilitate processing of the media file by the device for de-encapsulating a file, the first information is added to the panoramic picture of at least one viewpoint in N viewpoints, and the first information indicates the switching information during switching from the panoramic picture of the current viewpoint to the panoramic picture of the next viewpoint. For example, if N is 6, the first information is added to the panoramic pictures corresponding to the viewpoint 1, the viewpoint 2 and the viewpoint 3 in the 6 viewpoints respectively; the first information corresponding to the viewpoint 1 is configured to indicate the switching information when the panoramic picture of viewpoint 1 is switched to the panoramic picture of the current viewpoint; the first information corresponding to the viewpoint 2 is configured to indicate the switching information when the panoramic picture of viewpoint 2 is switched to the panoramic picture of the current viewpoint; and the first information corresponding to the viewpoint 3 is configured to indicate the switching information when the panoramic picture of viewpoint 3 is switched to the panoramic picture of the current viewpoint.

Based on this, after the device for de-encapsulating a file acquires the panoramic picture media file of N viewpoints, the panoramic pictures of different viewpoints can be switched firstly according to the first information in the media file, and then the switching effect of the panoramic pictures of multiple viewpoints is improved.

In order to facilitate description, the current viewpoint in at least one viewpoint is taken as an example for illustrating according to the embodiment of the present disclosure, and other viewpoints are used for referring.

According to the embodiment of the present disclosure, the specific adding position of first information in the media file is not limited.

In one embodiment, the first information can be added into the entity group.

In one embodiment, the entity group includes the coded bitstreams of the panoramic picture of N viewpoints, and the coded bitstreams of the panoramic picture of each viewpoint can be referred to as an item (or entity), so that the entity group includes N items (or entities), and the first information corresponding to different viewpoints can be added into the items (or entities) corresponding to different viewpoints, such as the head or tail of the item (or entity).

In one embodiment, the first information can be added into the media file and outside the entity group, such as being configured as a separate data box for indicating.

In some embodiments, the switching information indicated for switching the panoramic picture of the current viewpoint to the panoramic picture of the next viewpoint by the first information includes at least one of switching effect information, switching viewpoint information and switching window information.

In some embodiments, the switching effect information includes a switching effect flag for indicating whether a switching effect exists during switching from the panoramic picture of the current viewpoint to the panoramic picture of the next viewpoint.

In some embodiments, a field transition_type_flag can be configured to represent the switching effect flag.

For example, if the value of the switching effect flag transition_type_flag is a first value (such as 1), a switching effect exits during switching from the panoramic picture of the current viewpoint to the panoramic picture of the next viewpoint.

For another example, if the value of the switching effect fag transition_type_flag is an eleventh value (such as 0), there is no specified switching effect during switching from the panoramic picture of the current viewpoint to the panoramic picture of the next viewpoint.

According to the present disclosure, the specific values of the first value and the eleventh value are not limited, for example, the first value can be 1, and the eleventh value can be 0.

In some embodiments, if the value of the switching effect flag transition_type_flag is the first value, the switching effect information can further include switching effect period information.

In some embodiments, the switching effect period information can include a switching effect period flag transition_period_flag, and the switching effect period flag transition_period_flag is configured to indicate whether the period of the switching effect is specified or not during switching from the panoramic picture of the current viewpoint to the panoramic picture of the next viewpoint.

In some embodiments, the field transition_period_flag can be used for representing the switching effect period flag.

For example, if the value of the switching effect period flag transition_period_flag is a second value, the period of the switching effect is specified during switching from the panoramic picture of the current viewpoint to the panoramic picture of the next viewpoint.

For another example, if the value of the switching effect period flag transition_period_flag is a twelfth value, the period of the switching effect is not specified during switching from the panoramic picture of the current viewpoint to the panoramic picture of the next viewpoint.

According to the present disclosure, the specific values of the second value and the twelfth value are not limited, for example, the second value can be 1, and the twelfth value can be 0.

In some embodiments, if the value of the switching effect period flag transition_period_flag is the second value, the switching effect period information can also include the period viewpoint_transition_period of the switching effect.

In some embodiments, the viewpoint_transition_period field takes 2-4 s as a unit.

Based on the period of the switching effect, the device for de-encapsulating a file switches the panoramic picture of the current viewpoint to the panoramic picture of the next viewpoint in the switching process based on the switching effect period indicated by the first information. For example, if the switching effect period indicated by the first information is 2 s, the period of the switching effect is 2 s when the device for de-encapsulating a file switches the panoramic picture of the current viewpoint to the panoramic picture of the next viewpoint, thus the switching effect of the panoramic pictures of multiple viewpoints is improved, and the user experience is improved.

In some embodiments, if the value of the switching effect flag is the second value (such as 1), the switching effect information can further include the type of the switching effect. In some embodiments, the second value is the same as the first value.

In some embodiments, the second value is the same as the first value, for example, if the second value and the first value are both 1, that is, if the value of the switching effect flag is taken, the switching effect information can include the switching effect period and the type of the switching effect.

In some embodiments, a field transition_type_flag can be configured to represent the switching effect flag.

In some embodiments, the type of the switching effect includes at least one of a stepping type, a scaling type, a fade-out fade-in type and a fly-in type.

For example, if the value of the field transition_orientation_type of the type of the switching effect is a first preset value, the type of the switching effect is represented to be the stepping type.

For example, if the value of the field transition_orientation_type of the type of the switching effect is a second preset value, the type of the switching effect is represented to be the scaling type.

For example, if the value of the field transition_orientation_type of the type of the switching effect is a third preset value, the type of the switching effect is represented to be the fade-out fade-in type.

For example, if the value of the field transition_orientation_type of the type of the switching effect is a fourth preset value, the type of the switching effect is represented to be the fly-in type.

According to the embodiments of the present disclosure, the specific values of the first preset value, the second preset value, the third preset value and the fourth preset value are not limited.

In some embodiments, the first preset value is 0.
In some embodiments, the second preset value is 1.
In some embodiments, the second preset value is 2.
In some embodiments, the third preset value is 3.

Exemplary, the corresponding relation between the value of the field transition_orientation_type of the type of the switching effect of the switching effect is shown in Table 1.

TABLE 1

| Value | Description |
|---|---|
| 0 | Stepping type |
| 1 | Scaling type |
| 2 | Fade-out fade-in type |
| 3 | Fly-in type |
| Others | Reserved |

The type of the switching effect involved in the present disclosure includes, but is not limited to the types shown in Table 1.

Based on the type of the switching effect above, the device for de-encapsulating a file switches the panoramic picture of the current viewpoint to the panoramic picture of the next viewpoint in the switching process according to the type of the switching effect indicated by the first information. For example, if the type of the switching effect indicated by the first information is the stepping type, the device for de-encapsulating a file switches the panoramic picture of the current viewpoint to the panoramic picture of the next viewpoint according to the stepping type switching effect, so that the switching effect of the panoramic pictures of multiple viewpoints is improved, and the user experience is improved.

The switching effect information in the switching information is introduced as above.

In some embodiments, the switching information may include switching viewpoint information that may be understood as selection information for the next viewpoint to be switched from the current viewpoint.

In some embodiments, the switching viewpoint information includes a neighbor viewpoint flag for indicating whether the next viewpoint to be switched from the current viewpoint is a neighbor viewpoint of the current viewpoint.

In some embodiments, a field neighbor_viewpoint_flag can be configured to represent the neighbor viewpoint flag.

For example, if the value of the neighbor viewpoint flag neighbor_viewpoint_flag is a third value, the next viewpoint to be switched from the current viewpoint is a neighbor viewpoint of current viewpoint.

For another example, if the value of the neighbor viewpoint flag neighbor_viewpoint_flag is a fourth value, the next viewpoint to be switched from the current viewpoint is any one of the N viewpoints.

According to the present disclosure, the specific values of the third value and the fourth value are not limited, for example, the third value can be 1 and the fourth value can be 0.

In some embodiments, the default value of the field neighbor_viewpoint_flag of the neighbor viewpoint flag is 0.

In some embodiments, if the value of the neighbor viewpoint flag neighbor_viewpoint_flag is a third value, the switching viewpoint information can further include at least one of the number num_neighbor_vp of target neighbor viewpoints capable of being switched from the current viewpoint and viewpoint identifiersneighbor_vp_id of the target neighbor viewpoints.

In some embodiments, the viewpoint of the target neighbor viewpoint is uniquely identified by using the item identifier neighbor_entity_id of the target neighbor viewpoint.

Based on the neighbor viewpoint flag above, the device for de-encapsulating a file determines the next viewpoint capable of being switched from the current viewpoint according to the neighbor viewpoint flag indicated by the first information in the process of switching the panoramic picture of the current viewpoint to the panoramic picture of the next viewpoint, and decodes the media file of next viewpoint after de-encapsulating to obtain the panoramic picture of the current viewpoint, so that the panoramic picture of the current viewpoint is switched to the panoramic picture of the current viewpoint, the switching accuracy of the panoramic pictures of multiple viewpoints is realized, and the switching effect of the multi-viewpoint panoramic picture is improved.

The switching viewpoint information in the switching information is described above.

In some embodiments, the switching information may include a switching window type that may be understood as a selection strategy of an initial window of the next viewpoint when the current viewpoint is switched to the next viewpoint.

In some embodiments, the switching window information includes a switching window type which is the type of the initial window of the next viewpoint during switching from the panoramic picture of the current viewpoint to the panoramic picture of the next viewpoint. In some embodiments, the switching window type can be represented by a field transition_orientation_type.

For example, if the value of the switching window type transition_orientation_type is a fifth value, the initial window of next viewpoint is the same as the user viewing window of current viewpoint.

For example, if the value of the switching window type transition_orientation_type is a sixth value, the initial window of next viewpoint is determined by the recommended window property information of next viewpoint.

According to the present disclosure, the specific values of the fifth value and the sixth value are not limited, for example, the fifth value can be 0, and the sixth value can be 1.

In some embodiments, the default value of the switching window type transition_orientation_type field is 0.

Based on the switching window type above, the device for de-encapsulating a file can determine the initial window of the panoramic picture of the next viewpoint according to the switching window type when switching the panoramic picture of the current viewpoint to the panoramic picture of the next viewpoint, and displays the initial window to the user.

The current viewpoint of the at least one viewpoint is taken as an example for describing the first information corresponding to the panoramic picture of the current viewpoint.

In some embodiments, the first information corresponding to the at least one viewpoint may be included in the entity group.

In some embodiments, first information corresponding to at least one viewpoint can be included in the first data box, that is, the first information of each viewpoint in the at least one viewpoint is associated through the first data box. Therefore, the device for de-encapsulating a file can acquire the first information corresponding to the at least one viewpoint by decoding the first data box, and then switching between the panoramic pictures of multiple viewpoints is realized according to the first information corresponding to the at least one viewpoint, so that the switching effect of the panoramic pictures of multiple viewpoints is improved.

In some embodiments, in order to further improve the switching effect of the panoramic pictures of multiple viewpoints, the device for encapsulating a file further adds an identifier to at least one viewpoint in N viewpoints, so that the device for de-encapsulating a file can quickly determine the switched viewpoint through the viewpoint addition identifier, and the switching effect of the panoramic pictures of multiple viewpoints is further improved.

In some embodiments, the field viewpoint_id can be used for representing the viewpoint addition identifier.

In some embodiments, the viewpoint addition identifier can be located in the entity group.

In some embodiments, the identifier of the at least one viewpoint is in the first data box.

According to the embodiment of the present disclosure, the specific type of the first data box is not limited, for example, the first data box can be a brand-new data box, namely a newly added data box. In some embodiments, the first data box can be an existing data box in the media file, and the existing data box is expanded.

In some embodiments, the first data box can be a ViewpointItemAssociationBox (vpia for short).

In some embodiments, if the encapsulation standard of the media file is ISOBMFF, the first data box of the embodiment of the present disclosure includes the following contents:

Data box type: 'vpia'
Included in: GroupsListBox
Mandatory: No
Quantity: 0 or more If the group type of EntityToGroupBox is 'vpia', it indicates that the items in the entity group are panoramic pictures of different viewpoints.

Grammar

```
aligned(8) class ViewpointItemAssociationBox    extends
EntityToGroupBox('vpia') {
    unsigned int(32) group_id;
    unsigned int(32) num_entities_in_group;
    for(i=0; i<num_entities_in_group; i++){
        unsigned int(32) entity_id;
        unsigned int(16) viewpoint_id;
    unsigned int(1) initial_viewpoint_flag;
        unsigned int(1) transition_type_flag;
        unsigned int(1) transition_period_flag;
        unsigned int(1) transition_orientation_type;
        unsigned int(1) neighbor_viewpoint_flag;
        bit(3) reserved;
        if(transition_type_flag){
            unsigned int(8) viewpoint_transition_type;
    } if(transition_period_flag){
            unsigned int(8) viewpoint_transition_period;
    } if(neighbor_viewpoint_flag){
            unsigned int(8) num_neighbor_vp;
            for(i=0; i< num_neighbor_vp; i++){
            unsigned int(16) neighbor_vp_id;
        (Optional) unsigned int(32) neighbor_entity_id;
    }
    }
        string viewpoint_label;
    }
}
```

Semantics group_id: It is a non-negative integer configured to identify a specific entity group. The value of this field cannot be the same as the group_id of any other entity group; and it also cannot be the same as any other item_ID or track_ID containing GroupsListBox.

num_entities_in_group: It indicates the number of the entity_id mapped to this entity group.

entity_id: It is the value of item_ID of some item.

viewpoint_id: It indicates the identifier of each viewpoint:

initial_viewpoint_flag: It indicates whether the item is the initial viewpoint.

transition_type_flag: If the value is 1, a switching effect exits when the current viewpoint is switched to the next viewpoint. If the value is 0, there is no specified switching effect when the current viewpoint is switched to the next viewpoint.

transition_period_flag: If the value is 1, the switching effect period is specified when the current viewpoint is switched to the next viewpoint. If the value is 0, there is no specified switching effect period when the current viewpoint is switched to the next viewpoint.

transition_orientation_type: If the value is 0, the initial window of the next viewpoint is the same as the user viewing window of the current viewpoint when the current viewpoint is switched to the next viewpoint; and if the value is 1, the initial window of the next viewpoint is determined by the recommended window property of the next viewpoint when the current viewpoint is switched to the next viewpoint. The default value of the field is 0.

neighbor_viewpoint_flag: If the value is 1, the current viewpoint can only be switched to the neighbor viewpoint; and if the value is 0, the entity can be switched to any viewpoint in the current entity group. The default value of the field is 0.

viewpoint_transition_type: It indicates the type of the switching effect during viewpoint switching, and the meaning of the value is shown as following table.

The viewpoint switching type is shown as Table 2:

TABLE 2

| Value | Description |
| --- | --- |
| 0 | Stepping type |
| 1 | Scaling type |
| 2 | Fade-out fade-in type |
| 3 | Fly-in type |
| Others | Reserved | viewpoint_transition_period: It indicates the period of the viewpoint switching effect, and the field takes 2-4 s as a unit.

num_neighbor_vp: It indicates the number of target neighbor viewpoints capable of being switched from the current viewpoint.

neighbor_vp_id: it indicates the viewpoint identifier of the target neighbor viewpoint.

In some embodiments, the target neighbor viewpoint can be uniquely identified by using the item identifier neighbor_entity_id of the current neighbor viewpoint.

viewpoint_label: It indicates the descriptive label of the corresponding viewpoint, which is a string ending with a null character.

In the embodiment, a first field is used as first indication information, and different values are taken for the first field to indicate the type of the items having an association relationship in the entity group. Therefore, after the device for de-encapsulating a file receives the media file, the type of the items having the association relationship in the entity group can be determined according to the value of the first field in the first data box, and then part or all of the items in the entity group are selectively decoded according to actual needs to be displayed.

The first information is illustrated in the embodiment, but the first information of the embodiment of the present disclosure includes but is not limited to the embodiment above, and the embodiment of the present disclosure does not limit the first information.

The method for encapsulating a media file according to the present disclosure includes the following steps: acquiring the code bitstreams of the panoramic pictures of N viewpoints by the device for encapsulating a file, N being a positive integer greater than 1; and the coded bitstreams are encapsulated in the entity group; the first information is respectively added to the panoramic picture of at least one viewpoint in the N viewpoints to obtain the media file of the panoramic picture of N viewpoints, and the first information indicates the switching information during switching from the panoramic picture of the current viewpoint to the panoramic picture of the next viewpoint. Therefore, the device for de-encapsulating a file can switch and present the panoramic pictures of different viewpoints according to the switching information indicated by the first information, thereby improving the switching effect of the panoramic pictures of multiple viewpoints.

In some embodiments, the device for encapsulating a file adds the first information to the panoramic picture of at least one viewpoint in N viewpoints in the media file, and also adds second information to the panoramic picture of the at least one viewpoint. The second information indicates recommended window property information of the panoramic picture of the current viewpoint.

In some embodiments, the recommended window property information of the panoramic picture of the current viewpoint includes at least one of a number of recommended sphere regions and information of the recommended sphere regions.

The number of the recommended sphere regions according to the present disclosure can be one or more.

In some embodiments, the first sphere region in the recommended sphere regions is an initial window of the current viewpoint.

In some embodiments, the information of the recommended sphere regions includes at least one of an azimuth angle and an elevation angle of the sphere regions, an inclination angle of the sphere regions, the range of an azimuth angle and an elevation angle in the sphere regions, the range of centers of the sphere regions, etc.

In some embodiments, the second information is included in the entity group.

In some embodiments, the second information is included in a second data box.

According to the embodiment of the present disclosure, the type of the second data box is not limited, for example, the second data box can be a brand-new data box, namely a newly added data box. In some embodiments, the second data box can be an existing data box in the media file, and the existing data box is expanded.

In some embodiments, if the encapsulation standard of the above media file is ISOBMFF, the second data box of the embodiment of the present disclosure includes the following contents:

Data box type: 'resp'
Property type: descriptive property
Included in: ItemPropertyContainerBox
Mandatory (per item): No
Quantity (per item): 0 or 1

The recommended panoramic picture window property is configured to describe the recommended sphere region of the panoramic picture.

```
aligned(8) class RcSphereRegionProperty extends
  ItemFullProperty('rcsp', 0, 0) {
    unsigned int(8) num_sphere_regions;
    for(i=0; i< num_sphere_regions; i++){
      SphereRegionStruct( );
```

```
        }
    }
``` num_sphere_regions: It indicate the number of recommended sphere regions. The first recommended window is an initial window of the viewpoint.

SphereRegionStruct: It indicates the information of the recommended sphere region, and the code is as follows:

```
aligned(8) SphereRegionStruct(range_included_flag) {
    signed int(32) centre_azimuth;
    signed int(32) centre_elevation;
    singed int(32) centre_tilt;
    if (range_included_flag) {
        unsigned int(32) azimuth_range;
        unsigned int(32) elevation_range;
    }
    unsigned int(1) interpolate;
    bit(7) reserved = 0;
}
```

Semantics centre_azimuth and centre_elevation: They respectively specify the values of the azimuth angle and the elevation angle in the sphere region with the precision of 2-16. The range of centre_azimuth is [$-\pi*216, \pi*216-1$]. The range of centre_elevation is [$-\pi 2*216, \pi/2*216$].

centre_tilt: It specifies the inclination angle of the sphere region with precision of 2-16, and the range is [$-180°*216, 180°*216-1$].

azimuth_range and elevation_range: They, if present, respectively specify the azimuth angle and elevation angle ranges in the sphere region with precision of 2-16. The azimuth_range and elevation_range specify the range of the center of the sphere region. If the azimuth_range and elevation_range do not exist in an instance of a SpherRegionStruct, they are specified in a structural semantics including the instance of the SpherRegionStruct. The range of azimuth_range is [$0, 2\pi*216$], and the range of elevation_range is [$0, \pi*216$].

In some embodiments, Interpolate is specified in the structural semantics including the instance of the SpherRegionStruct.

The file encapsulation method according to the embodiment of the present disclosure includes the following steps: adding the recommended window property information by the device for encapsulating a file through the panoramic picture of at least one viewpoint so that device for de-encapsulating a file determines the initial window after viewpoint switching according to the recommended window property information; for example, if the value of the switching window type is a sixth value, the device for de-encapsulating a file determines the initial window of the panoramic picture of the next viewpoint according to the recommended window property information of the panoramic picture of the next viewpoint; and when the current viewpoint is switched to the next viewpoint, the initial window of the panoramic picture of the next viewpoint is displayed to the user, so that the switching and display effects of the multi-viewpoint panoramic picture are improved.

The method for encapsulating a media file according to the embodiment of the present disclosure is introduced above, and the method for de-encapsulating a media file according to the embodiment of the present disclosure is described in combination with specific embodiments.

Figure 6:
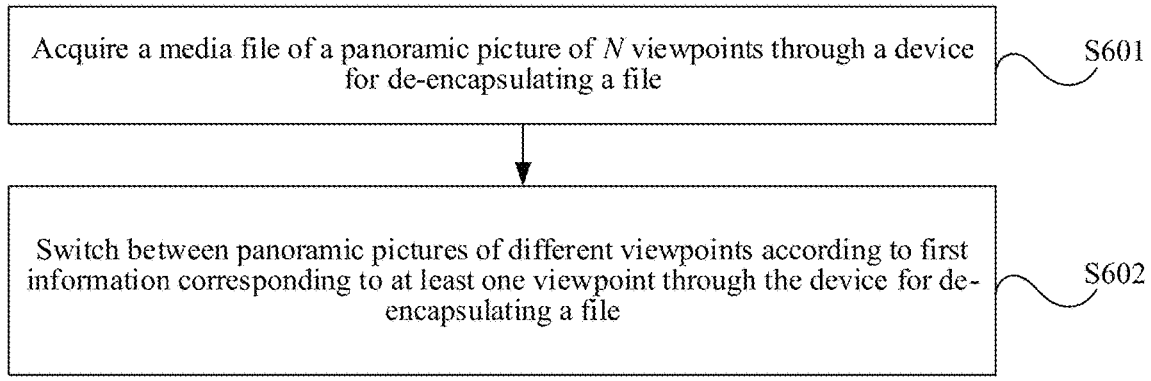
FIG. 6 is a flowchart of a method for de-encapsulating a media file according to one embodiment of the present disclosure.

FIG. 6 is a flowchart of a method for de-encapsulating a media file according to one embodiment of the present disclosure, as shown in FIG. 6, the method according to the embodiment of the present disclosure includes the following steps:

S601: Acquire a media file of a panoramic picture of N viewpoints through a device for de-encapsulating a file.

The media file includes first information of a panoramic picture item of at least one viewpoint in N viewpoints, and the first information indicates switching information during switching from the panoramic picture of the current viewpoint to the panoramic picture of the next viewpoint The media file further includes an entity group, and the entity group is configured to encapsulate coded bitstreams of panoramic pictures of N viewpoints.

According to the present disclosure, the mode of the device for de-encapsulating a file acquiring the media file of the panoramic picture of N viewpoints includes but is not limited to the follows:

Mode 1: The device for de-encapsulating a file receives the media file transmitted by the device for encapsulating a file. For example, the device for encapsulating a file encapsulates to obtain the media file according to the file encapsulation method of the embodiment above, and then transmits the media file to the device for de-encapsulating a file.

Mode 2: The device for de-encapsulating a file acquires the media file from other storage equipment (such as a cloud server). For example, the device for encapsulating a file encapsulates to obtain the media file according to the file encapsulation method of the embodiment above, and then transmits the media file to the storage equipment, for example, the media file is transmitted to the cloud server. When the device for de-encapsulating a file needs to consume the media file, for example, when a consumption request of a user is received, the media file is read from the memory device for the user to consume.

S602: Switch between panoramic pictures of different viewpoints according to the first information corresponding to the at least one viewpoint through the device for de-encapsulating a file.

As described above, the media file of the panoramic picture of N viewpoints according to the embodiment of the present disclosure includes first information of the panoramic picture of at least one viewpoint in N viewpoints, and the first information corresponding to each viewpoint in the at least one viewpoint is configured to indicate switching information during switching from the panoramic picture of the current viewpoint to the panoramic picture of the next viewpoint Therefore, after the device for de-encapsulating a file acquires the media file, switching between panoramic pictures of different viewpoints can be carried out according to the switching information indicated by the first information, and then the switching effect of the panoramic pictures of multiple viewpoints is improved. For example, the viewpoint 1 can be switched to the viewpoint 2, so that when the viewpoint 1 is switched to the viewpoint 2, switching of panoramic pictures between the two viewpoints is carried out according to the switching information indicated by the first information corresponding to the viewpoint 1, the accuracy of switching between the panoramic pictures of the two viewpoints is improved, moreover, the switching effect is improved, and the consumption experience of the user is enhanced.

In order to facilitate description, the current viewpoint in at least one viewpoint is taken as an example for illustrating in the embodiment of the present disclosure, and other viewpoints are used for referring. The current viewpoint can be understood as any one viewpoint in the at least one viewpoint.

The at least one viewpoint can be all viewpoints in N viewpoints and can also be part of viewpoints in the N viewpoints.

In some embodiments, the step S602 includes the following steps S602-A to S602-C:

S602-A: Receive a viewpoint switching operation inputted by the user through the device for de-encapsulating a file when the user consumes the panoramic picture of the current viewpoint.

The viewpoint switching operation indicates to switch from the current viewpoint to the next viewpoint.

In some embodiments, the switching operation is inputted by the user through a gesture mode.

In some embodiments, the switching operation is input through a voice mode.

In some embodiments, the switching operation is inputted by the user through a physical key.

In some embodiments, the switching operation can be a user viewing angle captured by the device for de-encapsulating a file, such as an offset position of the head of the user.

The embodiment of the present disclosure does not limit the mode of inputting the switching operation by the user.

S602-B: De-encapsulate and then decode, in response to the viewpoint switching operation, the corresponding panoramic picture item of the next viewpoint of the current viewpoint to obtain the corresponding panoramic picture of the next viewpoint through the device for de-encapsulating a file.

Specifically, the next viewpoint to be switched from the current viewpoint is determined, the corresponding panoramic picture item of the next viewpoint is acquired from the media file, and the panoramic picture item can be understood as a container for encapsulating the coded bitstream of the corresponding panoramic picture of the next viewpoint. The corresponding panoramic picture item of the next viewpoint is de-encapsulated to obtain the coded bitstream of the corresponding panoramic picture of the next viewpoint, and then the coded bitstream of the corresponding panoramic picture of the next viewpoint is decoded to obtain the corresponding panoramic picture of the next viewpoint.

S602-C: Switch the panoramic picture of the current viewpoint to the panoramic picture of the next viewpoint through the device for de-encapsulating a file according to first information of the current viewpoint.

Specifically, the panoramic picture of the current viewpoint is switched to the panoramic picture of the current viewpoint according to the switching information indicated by the first information of the current viewpoint.

In some embodiments, the switching information includes at least one of switching effect information, switching viewpoint information and switching window information.

In some embodiments, the switching effect information includes a switching effect flag for indicating whether a switching effect exists during switching from the panoramic picture of the current viewpoint to the panoramic picture of the next viewpoint.

In some embodiments, if the value of the switching effect flag is a second value (such as 1), the second value indicates that a switching effect exits during switching from the panoramic picture of the current viewpoint to the panoramic picture of the next viewpoint, and the switching effect information further includes the type of the switching effect.

In some embodiments, the type of the switching effect includes at least one of a stepping type, a scaling type, a fade-out fade-in type and a fly-in type.

In some embodiments, if first information of current viewpoint includes the type of the switching effect, the above S602-C includes:

S602-C1: Switch the panoramic picture of the current viewpoint to the panoramic picture of the next viewpoint through the device for de-encapsulating a file according to the type of the switching effect.

For example, if the type of the switching effect included in the first information of the current viewpoint is the fly-in type, the device for de-encapsulating a file switches the panoramic picture of the current viewpoint to the panoramic picture of the next viewpoint with the fly-in type switching effect.

In some embodiments, if the value of the switching effect flag is a first value (such as 1), the switching effect information further includes switching effect period information. In some embodiments, the first value is the same as the above second value in some embodiments.

In some embodiments, the switching effect period information includes a switching effect period flag for indicating whether the period of the switching effect is specified during switching from the panoramic picture of the current viewpoint to the panoramic picture of the next viewpoint.

In some embodiments, if the value of the switching effect period flag is the first value (such as 1), the first value indicates that the period of the switching effect is specified during switching from the panoramic picture of the current viewpoint to the panoramic picture of the next viewpoint, and the switching effect period information further includes the period of the switching effect.

In some embodiments, if the first information of the current viewpoint includes the period of the switching effect, the S602-C1 includes:

S602-C11: Switch the panoramic picture of the current viewpoint to the panoramic picture of the next viewpoint through the device for de-encapsulating a file according to the type and the period of the switching effect.

For example, if the type of the switching effect in the first information of the current viewpoint is the fly-in type, and the period of the switching effect is 2 s, the device for de-encapsulating a file switches the panoramic picture of the current viewpoint to the panoramic picture of the next viewpoint with the fly-in type switching effect, and the period of the fly-in type switching effect is 2 s.

In some embodiments, the switching viewpoint information includes a neighbor viewpoint flag for indicating whether the next viewpoint to be switched from the current viewpoint is a neighbor viewpoint of the current viewpoint.

In some embodiments, if the value of the neighbor viewpoint flag is a third value, the next viewpoint to be switched from the current viewpoint is the neighbor viewpoint of the current viewpoint; and if the value of the neighbor viewpoint flag is a fourth value, the next viewpoint to be switched from the current viewpoint is any one viewpoint in N viewpoints.

Based on this, if the first information includes the switching viewpoint information, S602-B of de-encapsulating and then decoding the corresponding panoramic picture item of the next viewpoint to obtain the corresponding panoramic picture of the next viewpoint includes the steps S602-B1 and S602-B2:

S602-B1: Determine the next viewpoint to be switched from the current viewpoint through the device for de-encapsulating a file according to the value of the neighbor viewpoint flag corresponding to the current viewpoint.

S602-B2: De-encapsulate and then decode the panoramic picture item of the next viewpoint by the device for de-encapsulating a file to obtain the panoramic picture of the current viewpoint.

For example, if the value of the neighbor viewpoint flag in the switching viewpoint information corresponding to the current viewpoint is a third value, it can be determined that the next viewpoint to be switched from the current viewpoint is an neighbor viewpoint of the current viewpoint, then the panoramic picture item of the neighbor viewpoint of current viewpoint can be de-encapsulated and then decoded to obtain the panoramic picture of the neighbor viewpoint of current viewpoint, and the panoramic picture of the neighbor viewpoint of current viewpoint is taken as the panoramic picture of the next viewpoint of current viewpoint.

For another example, if the value of the neighbor viewpoint flag in the switching viewpoint information corresponding to the current viewpoint is a fourth value, it can be determined that the next viewpoint to be switched from the current viewpoint is any viewpoint in the current entity group. Therefore, the device for de-encapsulating a file can de-encapsulate and then decode the corresponding panoramic picture item of any viewpoint in the entity group according to needs to obtain the panoramic picture of the next viewpoint of current viewpoint.

In some embodiments, if the value of the neighbor viewpoint flag is a third value, the switching viewpoint information can further include at least one of the number of target neighbor viewpoints which can be switched from the current viewpoint and viewpoint identifiers of the target neighbor viewpoints.

In some embodiments, the window switching information includes a switching window type, and the switching window type is the type of the initial window of the next viewpoint during switching from the panoramic picture of the current viewpoint to the panoramic picture of the next viewpoint.

In some embodiments, if the value of the switching window type is a fifth value, the initial window of the next viewpoint is the same as the user watching window of the current viewpoint; and in response to that a value of the switching window type is a sixth value, the initial window of the next viewpoint is determined by recommended window property information of the next viewpoint.

Based on this, if the first information corresponding to the current viewpoint includes the switching window type, the S602-C includes:

S602-C21: Determine the initial window of the panoramic picture of the next viewpoint through the device for de-encapsulating a file according to the switching window type; and S602-C22: Switch the panoramic picture of the current viewpoint to the panoramic picture of the next viewpoint and then display the initial window of the panoramic picture of the next viewpoint to the user through the device for de-encapsulating a file.

In some embodiments, the media file further includes second information of the panoramic picture of at least one viewpoint in N viewpoints, and the second information indicates recommended window property information of the panoramic picture of the current viewpoint.

Based on this, if the value of switching the window type is a sixth value, the S602-C21 includes the steps S602-C211 and S602-C212:

S602-C211: Acquire second information corresponding to the next viewpoint of current viewpoint through the device for de-encapsulating a file; and S602-C212: Determine the initial window of the panoramic picture of the next viewpoint through the device for de-encapsulating a file according to the recommended window property information of the panoramic picture of the current viewpoint indicated by the second information.

In some embodiments, the recommended window property information of the panoramic picture of the current viewpoint includes: at least one of a number of recommended sphere regions and information of the recommended sphere regions.

In some embodiments, the information of the recommended sphere regions includes at least one of an azimuth angle and an elevation angle of the sphere regions, an inclination angle of the sphere regions, the range of an azimuth angle and an elevation angle in the sphere regions, the range of centers of the sphere regions, etc.

In some embodiments, the first sphere region in a recommended sphere region is an initial window of current viewpoint.

In some embodiments, the first information corresponding to each viewpoint in the at least one viewpoint is associated through the first data box, so that the device for de-encapsulating a file can obtain the first information corresponding to each viewpoint by analyzing the first data box.

In some embodiments, the media file further includes an identifier of at least one viewpoint in N viewpoints.

In some embodiments, the identifier of the at least one viewpoint can be in the first data box.

According to the file de-encapsulation method provided by the embodiment of the present disclosure, the device for de-encapsulating a file realizes switching between the panoramic pictures of different viewpoints through the switching information indicated by the first information in the media file, so that the reliability of switching and the switching effect between the panoramic pictures of multiple viewpoints are improved, and the user experience is improved.

Figure 7:
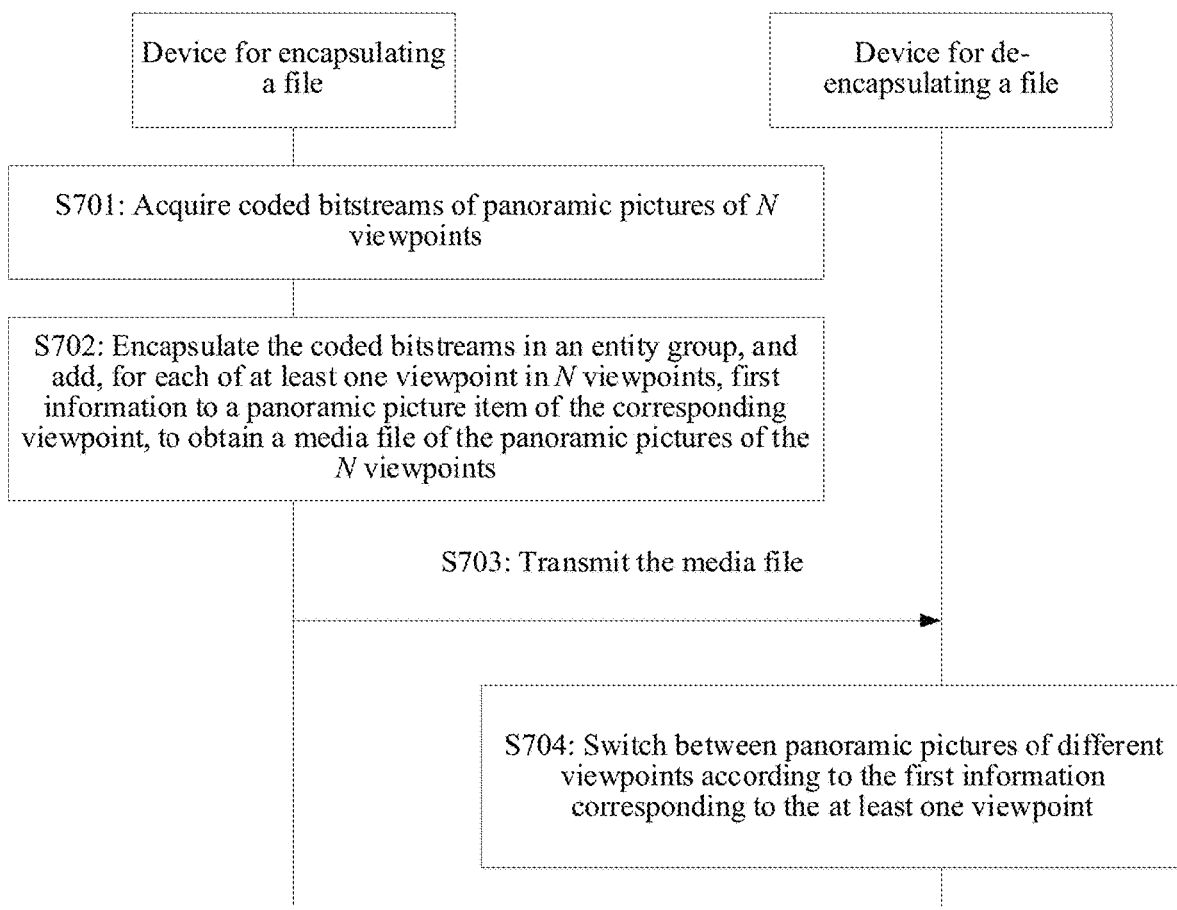
FIG. 7 is a schematic diagram of a media file encapsulation and de-encapsulation interaction flow according to one embodiment of the present disclosure.

FIG. 7 is a schematic diagram of a media file encapsulation and de-encapsulation interaction process according one embodiment of the application, as shown in FIG. 7, the method includes the following steps:

S701: Acquire coded bitstreams after coding panoramic pictures of N viewpoints through a device for encapsulating a file.

S702: Encapsulate coded bitstreams in an entity group, and add, for each of at least one viewpoint in N viewpoints, first information to a panoramic picture item of the corresponding viewpoint, to obtain a media file of panoramic picture of N viewpoints through the device for encapsulating a file.

The implementation process of the S701 and the S702 is consistent with the implementation process of the S501 and the S502, and the description of the S501 and the S502 is referred to, and no more details are described herein.

S703: Transmit the media file of the panoramic pictures of N viewpoints to a device for de-encapsulating a file through the device for encapsulating a file.

S704: Switch between panoramic pictures of different viewpoints according to the first information corresponding to the at least one viewpoint through the device for de-encapsulating a file.

For example, when the user consumes the panoramic picture of the current viewpoint, the device for de-encapsulating a file receives a viewpoint switching operation inputted by the user, the viewpoint switching operation indicates to switch from the current viewpoint to the next viewpoint. The device for de-encapsulating a file responds to the viewpoint switching operation to de-encapsulate and then decode the corresponding panoramic picture item of the next viewpoint to be switched from the current viewpoint so as to obtain a corresponding panoramic picture of the next viewpoint of current viewpoint, and switches the panoramic picture of the current viewpoint to the panoramic picture of the next viewpoint according to the first information of the current viewpoint.

The implementation process of the S704 is consistent with the implementation process of the S602, and the description of the S602 is referred to, and no more details are described herein.

In order to further describe the technical solutions of the embodiment of the present disclosure, illustration is carried out as follows.

For example, the device for encapsulating a file associates a plurality of panoramic pictures having an association relationship in content by using a ViewpointItemAssociationBox (the data box can be understood as the first data box) according to the association relationship between the panoramic picture items, and indicates the viewpoint ID of the corresponding panoramic picture of each viewpoint.

In the example, the at least one viewpoint is treated as N viewpoints for an example, the device for encapsulating a file adds the first information to the corresponding panoramic picture of each viewpoint in N viewpoints.

The process of the file encapsulating device encapsulating the media file includes the following steps:

Step 1: Add corresponding recommendation window property information to the corresponding panoramic picture item of each viewpoint through the device for encapsulating a file according to the condition of a recommendation window of the panoramic picture item.

Step 2: Define the switching effect when the corresponding panoramic picture item of each viewpoint is switched to the next viewpoint and whether the recommendation window of the next viewpoint is used or not through the device for encapsulating a file.

Step 3: Indicate information of the neighbor viewpoint which can be switched for the corresponding panoramic picture item of each viewpoint through the device for encapsulating a file.

Step 4: Transmit the media file through the device for encapsulating a file.

The first data box ViewpointItemAssociationBox includes three panoramic picture items, namely entity_id=1, entity_id=2 and entity_id=3, and first information is added to the three panoramic picture items respectively, and the content is shown as follows:

{entity_id=1;viewpoint_id=1;initial_
    viewpoint_flag=1;transition_type_flag=1;transition_period_flag=1;transition_
    orientation_type=0;neighbor_viewpoint_flag=1;
    viewpoint_transition_type=0;viewpoint_transition_period=32;num_neighbor_vp=1;
    neighbor_vp_id=2};

{entity_id=2;viewpoint_id=2;initial_
    viewpoint_flag=0;transition_type_flag=1;transition_period_flag=1;transition_
    orientation_type=0;neighbor_viewpoint_flag=1;
    viewpoint_transition_type=0;viewpoint_transition_period=32;num_neighbor_vp=1;
    neighbor_vp_id=3};

{entity_id=3;viewpoint_id=3;initial_
    viewpoint_flag=0;transition_type_flag=1;transition_period_flag=1;transition_
    orientation_type=1;neighbor_viewpoint_flag=0;
    viewpoint_transition_type=0;viewpoint_transition_period=32}.

Step 5: Receive the media file and switch between the corresponding panoramic pictures of different viewpoints through the device for de-encapsulating a file according to information in a first data box ViewpointItemAssociationBox, specifically including the following steps:

a): Take an initial viewpoint as a viewpoint1, and present the viewpoint1 firstly through the device for de-encapsulating a file.

b): Switch to a viewpoint 2 (it is known from the first information corresponding to the viewpoint1 in the first data box that the viewpoint1 can only be switched to the viewpoint 2) by a user through an interactive operation (the interactive operation can be the abovementioned switching operation) in the process of consuming the panoramic picture of viewpoint1, the switching effect being stepping type switching, and the effect period being 2 s. After the viewpoint 2 is switched to, present the same sphere region when the user watches the viewpoint1.

c): Switch to a viewpoint 3 (it is known from the first information corresponding to the viewpoint 2 in the first data box that the viewpoint 2 can only be switched to the viewpoint 3) by the user in the process of consuming the viewpoint 2, the switching effect being stepping switching, and the effect period being 2 s. After the viewpoint 3 is switched to, present the same sphere region when the user watches the viewpoint 2.

d): Switch to the viewpoint1 or the viewpoint 2 by the user in the process of consuming the viewpoint 3, the switching effect being stepping switching, and the effect period being 2 s. After the viewpoint 1 or the viewpoint 2 is switched to, present a corresponding recommended sphere region of the viewpoint 1 or the viewpoint 2 to the user according to recommended window property information RcSphereRegionProperty{centre_azimuth=0; centre_elevation=0; centre_tilt=0; azimuth_range=60; elevation_range=60} of the viewpoint 1 or the viewpoint 2.

According to the method for encapsulating a media file provided by the embodiment of the present disclosure, the first information is respectively added for at least one viewpoint in N viewpoints, the first information indicates the switching information during switching from the panoramic picture of the current viewpoint to the panoramic picture of the next viewpoint; and then the device for de-encapsulating a file realizes switching between panoramic pictures of different viewpoints according to the first information, so that the switching and presentation problems of the panoramic pictures of multiple viewpoints can be better solved, and the switching effect and the user experience are improved.

It is to be understood that FIG. 5 to FIG. 7 are only examples of the present disclosure and are not understood as limitations to the present disclosure.

The implementations of the present disclosure are described in detail above with reference to the accompanying drawings. However, the present disclosure is not limited to the specific details in the foregoing implementations, a plurality of simple deformations may be made to the technical solution of the present disclosure within a range of the technical concept of the present disclosure, and these simple deformations fall within the protection scope of the present disclosure. For example, the specific technical characteristics described in the specific embodiment can be combined in any proper mode under the condition that contradiction is avoided, and in order to avoid unnecessary repetition, various possible combination modes are not explained additionally. For another example, various different embodiments of the present disclosure can be randomly combined, and as long as the ideas of the present disclosure are not violated, the embodiments also need to be regarded as the content disclosed by the present disclosure.

The method embodiment of the present disclosure is described in detail above in combination with FIG. 5 to FIG. 7, and the apparatus embodiment of the present disclosure is described in detail as follows.

Figure 8:
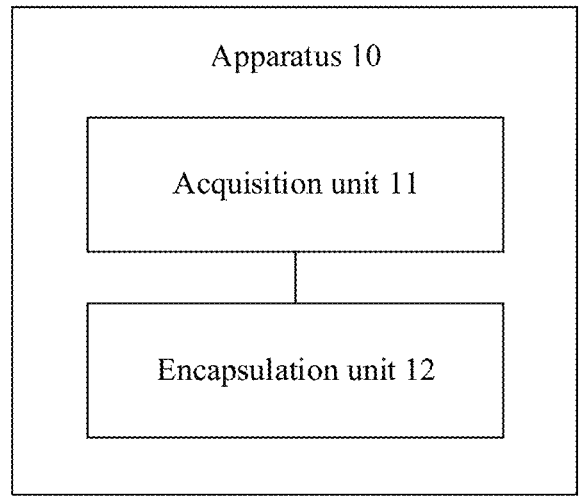
FIG. 8 is a structural schematic diagram of an apparatus for encapsulating a media file according to one embodiment of the present disclosure.

FIG. 8 is a structural schematic diagram of an apparatus for encapsulating a media file according to one embodiment of the present disclosure, the apparatus 10 is applied to the device for encapsulating a file, and the apparatus 10 includes:

an acquisition unit 11 which is configured to acquire a coded bitstream after coding panoramic pictures of N viewpoints, and N being a positive integer greater than 1; and an encapsulation unit 12 which is configured to encapsulate the coded bitstream in an entity group and add first information to the panoramic picture of at least one viewpoint in N viewpoints to obtain a media file of the panoramic picture of N viewpoints, and the first information indicating switching information during switching from the panoramic picture of the current viewpoint to the panoramic picture of the next viewpoint.

In some embodiments, the switching information includes at least one of switching effect information, switching viewpoint information and switching window information.

In some embodiments, the switching effect information includes a switching effect flag for indicating whether a switching effect exists during switching from the panoramic picture of the current viewpoint to the panoramic picture of the next viewpoint.

In some embodiments, if the value of the switching effect flag is a first value (such as 1), the switching effect information further includes switching effect period information, the first value indicating that a switching effect exits during switching from the panoramic picture of the current viewpoint to the panoramic picture of the next viewpoint.

In some embodiments, the switching effect period information includes a switching effect period flag for indicating whether a period of the switching effect is specified during switching from the panoramic picture of the current viewpoint to the panoramic picture of the next viewpoint.

In some embodiments, if the value of the switching effect period flag is a first value, the switching effect period information further includes a period of the switching effect, the first value indicating that the period of the switching effect is specified during switching from the panoramic picture of the current viewpoint to the panoramic picture of the next viewpoint.

In some embodiments, if the value of the switching effect flag is a second value (such as 1), the switching effect information further includes a type of the switching effect, the second value indicating that a switching effect exits during switching from the panoramic picture of the current viewpoint to the panoramic picture of the next viewpoint.

In some embodiments, the type of the switching effect includes at least one of a stepping type, a scaling type, a fade-out fade-in type and a fly-in type.

In some embodiments, the switching viewpoint information includes a neighbor viewpoint flag for indicating whether the next viewpoint to be switched from the current viewpoint is a neighbor viewpoint of the current viewpoint.

In some embodiments, if the value of the neighbor viewpoint flag is a third value, the next viewpoint to be switched from the current viewpoint is the neighbor viewpoint of the current viewpoint; and in response to that a value of the neighbor viewpoint flag is a fourth value, the next viewpoint to be switched from the current viewpoint is any one viewpoint in the N viewpoints.

In some embodiments, if the value of the neighbor viewpoint flag is a third value, the switching viewpoint information can further include at least one of the number of target neighbor viewpoints which can be switched from the current viewpoint and viewpoint identifiers of the target neighbor viewpoints.

In some embodiments, the switching window information includes a switching window type which is the type of the initial window of the next viewpoint during switching from the panoramic picture of the current viewpoint to the panoramic picture of the next viewpoint.

In some embodiments, if the value of the switching window type is a fifth value, the initial window of the next viewpoint is the same as the user watching window of the current viewpoint; and if the value of the switching window type is a sixth value, the initial window of the next viewpoint is determined by recommended window property information of the next viewpoint.

In some embodiments, the first information corresponding to each of the at least one viewpoint is associated by the first data box.

In some embodiments, the encapsulation unit 12 is further configured to add an identifier to at least one viewpoint in N viewpoints.

In some embodiments, the identifier of the at least one viewpoint is in the first data box.

In some embodiments, the encapsulation unit 12 is further configured to add second information to the panoramic picture of at least one viewpoint in N viewpoints, the second information indicating recommended window property information for the panoramic picture of the current viewpoint.

In some embodiments, the recommended window property information of the panoramic picture of the current viewpoint includes at least one of a number of recommended sphere regions and information of the recommended sphere regions.

In some embodiments, the first one of the recommended sphere regions is an initial window of current viewpoint.

In some embodiments, the second information is included in the second data box.

It is to be understood that device embodiments and method embodiments may correspond to each other, and similar descriptions may refer to method embodiments. No more detailed description is described herein. Specifically, the apparatus 10 shown in FIG. 8 may perform the method embodiment corresponding to the file encapsulation apparatus, and the aforementioned and other operations and/or functions of various modules in the apparatus 8 are respectively to implement the method embodiment corresponding to the file encapsulation apparatus, for simplicity, no more detailed description is described herein.

Figure 9:
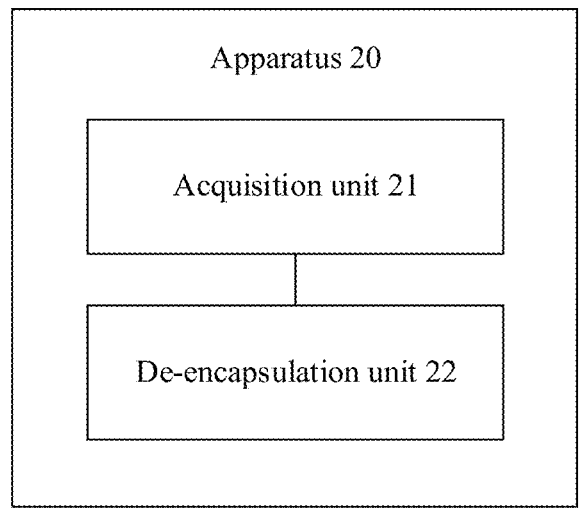
FIG. 9 is a structural schematic diagram of an apparatus for de-encapsulating a media file according to one embodiment of the present disclosure.

FIG. 9 is a structural schematic diagram of an apparatus for de-encapsulating a media file according to one embodiment of the present disclosure, the apparatus 20 is applied to the device for de-encapsulating a file, and the device 20 includes:

an acquisition unit 21 configured to acquire a media file of panoramic pictures of N viewpoints, the media file including first information of the panoramic picture of at least one viewpoint in the N viewpoints, and the first information indicating switching information during switching from the panoramic picture of the current viewpoint to the panoramic picture of the next viewpoint; and a de-encapsulation unit 22 being configured to switch between the panoramic pictures of different viewpoints according to the first information corresponding to the at least one viewpoint.

In some embodiments, the de-encapsulation unit 22 is specifically configured to receive a viewpoint switching operation inputted by a user when the user consumes the panoramic picture of the current viewpoint, the viewpoint switching operation indicating switching from the current viewpoint to the next viewpoint, de-encapsulate and then decode, in response to the viewpoint switching operation, a corresponding panoramic picture item of the next viewpoint to obtain a corresponding panoramic picture of the next viewpoint, and switch the panoramic picture of the current viewpoint to the panoramic picture of the next viewpoint according to the first information of the current viewpoint.

In some embodiments, the switching information includes at least one of switching effect information, switching viewpoint information and switching window information.

In some embodiments, the switching effect information includes a switching effect flag for indicating whether a switching effect exists during switching from the panoramic picture of the current viewpoint to the panoramic picture of the next viewpoint.

In some embodiments, if the value of the switching effect flag is a second value (such as 1), the switching effect information further includes a type of the switching effect, the second value indicating that a switching effect exits during switching from the panoramic picture of the current viewpoint to the panoramic picture of the next viewpoint.

In some embodiments, the type of the switching effect includes at least one of a stepping type, a scaling type, a fade-out fade-in type and a fly-in type.

In some embodiments, if the first information of the current viewpoint includes the type of the switching effect, the de-encapsulation unit 22 is specifically configured to switch the panoramic picture of the current viewpoint to the panoramic picture of the next viewpoint according to the type of the switching effect.

In some embodiments, if the value of the switching effect flag is a first value (such as 1), the switching effect information further includes switching effect period information, the first value indicating that a switching effect exits during switching from the panoramic picture of the current viewpoint to the panoramic picture of the next viewpoint.

In some embodiments, the switching effect period information includes a switching effect period flag for indicating whether a period of the switching effect is specified during switching from the panoramic picture of the current viewpoint to the panoramic picture of the next viewpoint.

In some embodiments, if the value of the switching effect period flag is a first value, the switching effect period information further includes a period of the switching effect, the first value indicating that the period of the switching effect is specified during switching from the panoramic picture of the current viewpoint to the panoramic picture of the next viewpoint.

In some embodiments, if first information of current viewpoint includes the period of the switching effect, the de-encapsulation unit 22 is specifically configured to switch the panoramic picture of the current viewpoint to the panoramic picture of the next viewpoint according to the type and period of the switching effect.

In some embodiments, the switching viewpoint information includes a neighbor viewpoint flag for indicating whether the next viewpoint to be switched from the current viewpoint is a neighbor viewpoint of the current viewpoint.

In some embodiments, if the value of the neighbor viewpoint flag is a third value, the next viewpoint to be switched from the current viewpoint is the neighbor viewpoint of the current viewpoint; and in response to that a value of the neighbor viewpoint flag is a fourth value, the next viewpoint to be switched from the current viewpoint is any one viewpoint in the N viewpoints.

In some embodiments, if the first information includes the switching viewpoint information, the de-encapsulation unit 22 is specifically configured to determine a next viewpoint which can be switched from the current viewpoint according to the value of the neighbor viewpoint flag, and de-encapsulate and then decode the panoramic picture item of next viewpoint to obtain the panoramic picture of the current viewpoint.

In some embodiments, if the value of the neighbor viewpoint flag is a third value, the switching viewpoint information can further include at least one of the number of target neighbor viewpoints which can be switched from the current viewpoint and viewpoint identifiers of the target neighbor viewpoints.

In some embodiments, the switching window information includes a switching window type which is the type of the initial window of the next viewpoint during switching from the panoramic picture of the current viewpoint to the panoramic picture of the next viewpoint.

In some embodiments, if the first information includes the switching window type, the de-encapsulation unit 22 is specifically configured to determine an initial window of a panoramic picture of the current viewpoint according to the switching window type, and display the initial window of the panoramic picture of the next viewpoint to the user after the panoramic picture of the current viewpoint is switched to the panoramic picture of the next viewpoint.

In some embodiments, if the value of the switching window type is a fifth value, the initial window of the next viewpoint is the same as the user watching window of the current viewpoint; and in response to that a value of the switching window type is a sixth value, the initial window of the next viewpoint is determined by recommended window property information of the next viewpoint.

In some embodiments, the media file further includes second information of the panoramic picture of at least one viewpoint in N viewpoints, and the second information indicates recommended window property information of the panoramic picture of the current viewpoint.

In some embodiments, if the value of the switching window type is a sixth value, the de-encapsulation unit 22 is specifically configured to acquire second information corresponding to the next viewpoint, and determine the initial window of the panoramic picture of the next viewpoint according to recommended window property information of the panoramic picture of the next viewpoint indicated by the second information.

In some embodiments, the recommended window property information of the panoramic picture of the current viewpoint includes at least one of a number of recommended sphere regions and information of the recommended sphere regions.

In some embodiments, the first one of the recommended sphere regions is an initial window of current viewpoint.

In some embodiments, the first information corresponding to each viewpoint in the at least one viewpoint is associated through the first data box.

In some embodiments, the media file further includes an identifier of at least one viewpoint in N viewpoints.

In some embodiments, the identifier of the at least one viewpoint is in the first data box.

It is to be understood that device embodiments and method embodiments may correspond to each other, and similar descriptions may refer to method embodiments. No more detailed description is described herein. Specifically, the apparatus 20 shown in FIG. 9 can execute the method embodiment corresponding to the server, and the aforementioned and other operations and/or functions of each module in the apparatus 20 are respectively used for realizing the method embodiment corresponding to the file de-encapsulation apparatus, and are not described herein for simplicity.

The apparatus of the embodiment of the present disclosure is described from the perspective of a functional module in combination with the accompanying drawings. It is to be understood that the functional module can be realized in a hardware form, can be realized through instructions in a software form, and can also be realized through combination of hardware and software modules. Specifically, the steps of the method embodiment in the embodiment of the present disclosure can be completed through an integrated logic circuit of hardware in a processing unit and/or instructions in a software form, and the steps of the method disclosed by the embodiment of the present disclosure can be directly embodied in that a hardware decoding processing unit completes execution, or the hardware and software modules in the decoding processing unit are combined to complete execution. In some embodiments, the software module may be stored in a storage medium that is mature in the art, such as a random access memory, a flash memory, a read-only memory, a programmable, an electrically erasable programmable memory, or a register. The storage medium is located in the memory. The processing unit reads information in the memory and completes the steps of the method embodiment in combination with hardware thereof.

Figure 10:
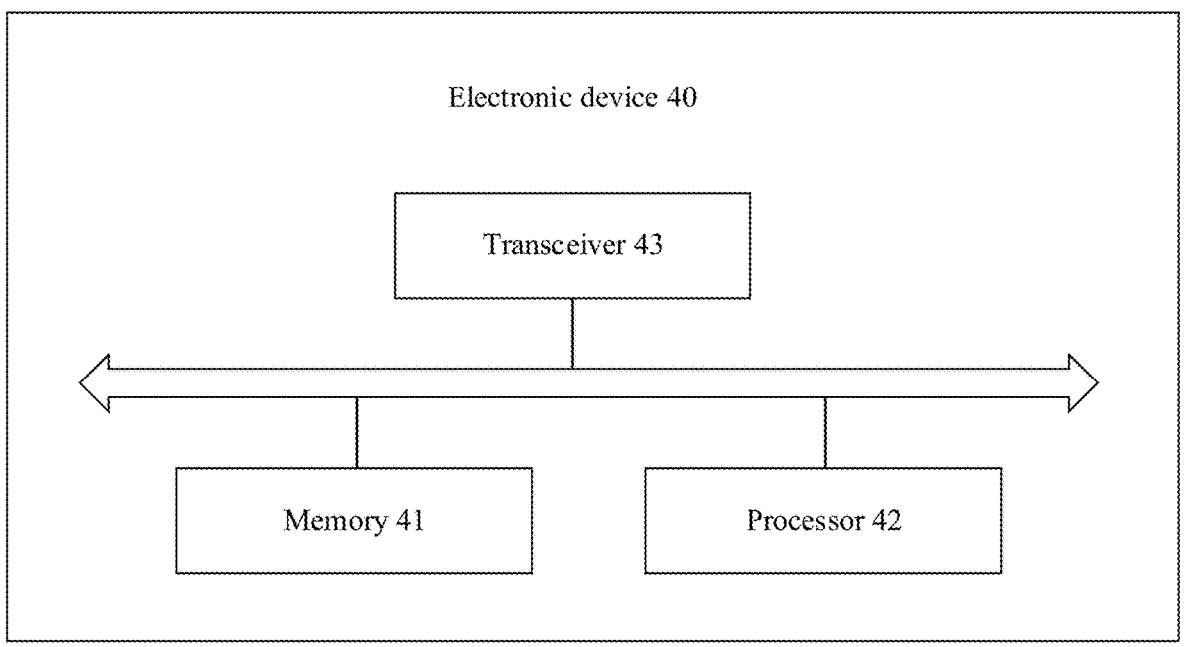
FIG. 10 is a schematic block diagram of an electronic device according to one embodiment of the present disclosure.

FIG. 10 is a schematic block diagram of an electronic device according to the embodiment of the present disclosure, and the electronic device can be the device for encapsulating a file or the device for de-encapsulating a file, or the electronic device has the functions of the device for encapsulating a file and the device for de-encapsulating a file.

As shown in FIG. 10, the electronic device 40 can include:
a memory 41 and a memory 42, and the memory 41 is configured to store a computer program and transmit a program code to the memory 42. In other words, the memory 42 can call and run a computer program from the memory 41 to realize the method in the embodiment of the present disclosure.

For example, the memory 42 can be configured to execute the method embodiment according to an instruction in the computer program.

In some embodiments of the present disclosure, the memory 42 can include but is not limited to
a general-purpose processing unit, a digital signal processing processor (DSP), an application-specific integrated circuit (ASIC), a field-programmable gate array (FPGA), or other programmable logic devices, discrete gate or transistor logic devices, and discrete hardware components, In some embodiments of the present disclosure, the memory 41 includes but is not limited to
a volatile memory and/or a nonvolatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM) serving as an external cache. Through illustrative but not limited description, RAMs in many forms, for example, a static RAM (SRAM), a Dynamic RAM (DRAM), a synchronous DRAM (SDRAM), a double data rate SDRAM (DDR SDRAM), an enhanced SDRAM (ESDRAM), a synch link DRAM (SLDRAM), and a direct rambus RAM (DRRAM), are available.

In some embodiments of the present disclosure, the computer program can be divided into one or more modules, and the one or more modules are stored in the memory 41 and executed by the memory 42 to complete the method provided by the present disclosure. The one or more modules can be a series of computer program instruction segments capable of completing specific functions, and the instruction segments are used for describing the execution process of the computer program in the video making equipment.

As shown in FIG. 10, the electronic device 40 may include:
a transceiver 40, and the transceiver 43 can be connected to the memory 42 or the memory 41.

The memory 42 can control the transceiver 43 to communicate with other devices, specifically, the memory can transmit information or data to other devices or receive information or data transmitted by other devices. The transceiver 43 can include a transmitter and a receiver. The transceiver 43 can further include one or more antennas.

It is to be understood that all components in a video production device are connected through a bus system, where the bus system includes a power bus, a control bus and a status signal bus besides a data bus.

The present disclosure further provides a computer storage medium; a computer program is stored on the computer storage medium; and when the computer program is executed by a computer, the computer can execute the method in the embodiment of the method. Alternatively, the embodiment of the present disclosure further provides a computer program product containing an instruction, and when the instruction is executed by the computer, the computer can execute the method in the embodiment of the method.

Technical features of the foregoing embodiments may be combined in different manners to form other embodiments. To make description concise, not all possible combinations of the technical features in the foregoing embodiments are described. However, the combinations of these technical features shall be considered as falling within the scope recorded by this specification provided that no conflict exists.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the appended claims.

What is claimed is:

1. A method for encapsulating a media file, applied to a device for encapsulating a file and comprising:
    receiving coded bitstreams of panoramic pictures of N viewpoints, N being a positive integer greater than 1; and
    encapsulating the coded bitstreams in an entity group, and respectively adding, for at least one viewpoint in the N viewpoints, first information to a panoramic picture of the corresponding viewpoint, to obtain a media file of the panoramic pictures of the N viewpoints, the first information indicating switching information during switching from a panoramic picture of a current viewpoint to another panoramic picture of a next viewpoint, wherein the switching information comprises at least one of: switching effect information, switching viewpoint information or switching window information;
        the switching effect information comprises a switching effect flag, the switching effect flag indicating whether a switching effect exists during switching from the panoramic picture of the current viewpoint to the panoramic picture of the next viewpoint;
        the switching viewpoint information comprises a neighbor viewpoint flag, the neighbor viewpoint flag indicating whether the next viewpoint to be switched from the current viewpoint is a neighbor viewpoint of the current viewpoint or any one of the N viewpoints; and
        the switching window information comprises a switching window type, the switching window type being a type of an initial window of the next viewpoint during switching from the panoramic picture of the current viewpoint to the panoramic picture of the next viewpoint.

2. The method according to claim 1, wherein in response to that a value of the switching effect flag is a first value, the switching effect information further comprises switching effect period information, the first value indicating that the switching effect exits during switching from the panoramic picture of the current viewpoint to the panoramic picture of the next viewpoint; and the switching effect period information comprises a switching effect period flag, the switching effect period flag indicating whether a period of the switching effect is specified during switching from the panoramic picture of the current viewpoint to the panoramic picture of the next viewpoint.

3. The method according to claim 2, wherein in response to that a value of the switching effect period flag is a first flag value, the switching effect period information further comprises a period of the switching effect, the first flag value indicating that the period of the switching effect is specified during switching from the panoramic picture of the current viewpoint to the panoramic picture of the next viewpoint.

4. The method according to claim 1, wherein in response to that a value of the switching effect flag is a second value, the switching effect information further comprises a type of the switching effect, the second value indicating that the switching effect exits during switching from the panoramic picture of the current viewpoint to the panoramic picture of the next viewpoint.

5. The method according to claim 4, wherein the type of the switching effect comprises at least one of a stepping type, a scaling type, a fade-out fade-in type and a fly-in type.

6. The method according to claim 1, wherein
    in response to that a value of the neighbor viewpoint flag is a third value, the next viewpoint to be switched from the current viewpoint is the neighbor viewpoint of the current viewpoint; and
    in response to that a value of the neighbor viewpoint flag is a fourth value, the next viewpoint to be switched from the current viewpoint is any one viewpoint in the N viewpoints.

7. The method according to claim 6, wherein in response to that the value of the neighbor viewpoint flag is the third value, the switching viewpoint information further comprises at least one of a number of target neighbor viewpoints which can be switched from the current viewpoint and viewpoint identifiers of the target neighbor viewpoints.

8. The method according to claim 1, wherein
    in response to that a value of the switching window type is a fifth value, the initial window of the next viewpoint is the same as a user watching window of the current viewpoint; and
    in response to that a value of the switching window type is a sixth value, the initial window of the next viewpoint is determined by recommended window property information of the next viewpoint.

9. The method according to claim 1, wherein the first information corresponding to each of the at least one viewpoint is associated by a first data box.

10. The method according to claim 9, further comprising:
    adding an identifier to at least one viewpoint in the N viewpoints, the identifier of the at least one viewpoint being in the first data box.

11. The method according to claim 1, further comprising:
    adding, for the at least one viewpoint in the N viewpoints, second information to the panoramic picture of the corresponding viewpoint, the second information indicating recommended window property information for the panoramic picture of the current viewpoint.

12. The method according to claim 11, wherein the recommended window property information of the panoramic picture of the current viewpoint comprises: at least one of a number of recommended sphere regions and information of the recommended sphere regions.

13. A method for de-encapsulating a media file, applied to a device for de-encapsulating a file and comprising:
    acquiring a media file of panoramic pictures of N viewpoints, the media file comprising, for at least one viewpoint in the N viewpoints, first information of a panoramic picture of the corresponding viewpoint, and the first information indicating switching information during switching from a panoramic picture of a current viewpoint to a panoramic picture of a next viewpoint; and
    switching between the panoramic pictures of different viewpoints according to the first information corresponding to the at least one viewpoint,
    wherein the switching information comprises at least one of: switching effect information, switching viewpoint information or switching window information;
        the switching effect information comprises a switching effect flag, the switching effect flag indicating whether a switching effect exists during switching from the panoramic picture of the current viewpoint to the panoramic picture of the next viewpoint;
        the switching viewpoint information comprises a neighbor viewpoint flag, the neighbor viewpoint flag indicating whether the next viewpoint to be switched from the current viewpoint is a neighbor viewpoint of the current viewpoint or any one of the N viewpoints; and the switching window information comprises a switching window type, the switching window type being a type of an initial window of the next viewpoint during switching from the panoramic picture of the current viewpoint to the panoramic picture of the next viewpoint.

14. The method according to claim 13, wherein if a value of the switching effect flag is a second value, the switching effect information further comprises a type of the switching effect, the second value indicating that a switching effect exits during switching from the panoramic picture of the current viewpoint to the panoramic picture of the next viewpoint; and the switching the panoramic picture of the current viewpoint to the panoramic picture of the next viewpoint according to the first information of the current viewpoint comprises:

switching the panoramic picture of the current viewpoint to the panoramic picture of the next viewpoint according to the type of the switching effect.

15. The method according to claim 14, wherein if a value of the switching effect flag is a first value, the switching effect information further comprises switching effect period information, the first value indicating that the switching effect exits during switching from the panoramic picture of the current viewpoint to the panoramic picture of the next viewpoint; and the switching effect period information comprises a switching effect period flag, the switching effect period flag indicating whether a period of the switching effect is specified during switching from the panoramic picture of the current viewpoint to the panoramic picture of the next viewpoint.

16. The method according to claim 15, wherein if a value of the switching effect period flag is a first value, the switching effect period information further comprises a period of the switching effect, the first value indicating that the period of the switching effect is specified during switching from the panoramic picture of the current viewpoint to the panoramic picture of the next viewpoint; and the switching the panoramic picture of the current viewpoint to the panoramic picture of the next viewpoint according to the type of the switching effect comprises:

switching the panoramic picture of the current viewpoint to the panoramic picture of the next viewpoint according to the type and period of the switching effect.

17. The method according to claim 13, wherein the switching between the panoramic pictures of different viewpoints according to the first information corresponding to the at least one viewpoint comprises:

receiving a viewpoint switching operation inputted by a user in response to that the user consumes the panoramic picture of the current viewpoint, the viewpoint switching operation indicating to switch from the current viewpoint to the next viewpoint;

in response to that that the first information comprises the neighbor viewpoint flag, determining the next viewpoint to be switched from the current viewpoint according to the value of the neighbor viewpoint flag;

de-encapsulating and then decoding a panoramic picture item of next viewpoint to obtain a panoramic picture of the next viewpoint; and switching the panoramic picture of the current viewpoint to the panoramic picture of the next viewpoint according to the first information of the current viewpoint.

18. An apparatus for encapsulating a media file, applied to a device for encapsulating a file and comprising:

at least one processor and at least one memory, the at least one memory being configured to store a computer program, and the at least one processor being configured to call and run the computer program stored in the at least one memory and perform:

receiving coded bitstreams of panoramic pictures of N viewpoints, N being a positive integer greater than 1; and encapsulating the coded bitstreams in an entity group, and respectively adding, for at least one viewpoint in the N viewpoints, first information to a panoramic picture of the corresponding viewpoint, to obtain a media file of the panoramic pictures of the N viewpoints, the first information indicating switching information during switching from a panoramic picture of a current viewpoint to another panoramic picture of a next viewpoint, wherein the switching information comprises at least one of: switching effect information, switching viewpoint information or switching window information;

the switching effect information comprises a switching effect flag, the switching effect flag indicating whether a switching effect exists during switching from the panoramic picture of the current viewpoint to the panoramic picture of the next viewpoint;

the switching viewpoint information comprises a neighbor viewpoint flag, the neighbor viewpoint flag indicating whether the next viewpoint to be switched from the current viewpoint is a neighbor viewpoint of the current viewpoint or any one of the N viewpoints; and the switching window information comprises a switching window type, the switching window type being a type of an initial window of the next viewpoint during switching from the panoramic picture of the current viewpoint to the panoramic picture of the next viewpoint.

19. A non-transitory computer-readable storage medium, storing a computer program, the computer program causing a computer to execute the method for de-encapsulating the media file according to claim 13.

20. An apparatus for de-encapsulating a media file, comprising:

at least one processor and at least one memory, the at least one memory being configured to store a computer program, and the at least one processor being configured to call and run the computer program stored in the at least one memory and perform the method for de-encapsulating the media file according to claim 13.

* * * * *